(12) United States Patent
Takahashi et al.

(10) Patent No.: US 9,868,092 B2
(45) Date of Patent: Jan. 16, 2018

(54) GAS-CONTAINING LIQUID GENERATING APPARATUS AND GAS-CONTAINING LIQUID INJECTING MODULE

(71) Applicant: Asupu Co., Ltd., Shizuoka-ken (JP)

(72) Inventors: Masaru Takahashi, Shizuoka-ken (JP); Hiromi Takahashi, Shizuoka-ken (JP); Koji Takahashi, Shizuoka-ken (JP)

(73) Assignee: ASUPU CO., LTD, Shizuoka-ken (JP)

( * ) Notice: Subject to any disclaimer, the term of this patent is extended or adjusted under 35 U.S.C. 154(b) by 55 days.

(21) Appl. No.: 15/028,354

(22) PCT Filed: Sep. 26, 2014

(86) PCT No.: PCT/JP2014/075597
§ 371 (c)(1),
(2) Date: Apr. 8, 2016

(87) PCT Pub. No.: WO2015/056547
PCT Pub. Date: Apr. 23, 2015

(65) Prior Publication Data
US 2016/0250604 A1 Sep. 1, 2016

(30) Foreign Application Priority Data

Oct. 17, 2013 (JP) .................... 2013-216674

(51) Int. Cl.
| | |
|---|---|
| *B01F 3/04* | (2006.01) |
| *B01D 19/00* | (2006.01) |
| *B01F 5/06* | (2006.01) |
| *B01F 5/10* | (2006.01) |
| *B01F 11/02* | (2006.01) |
| *B01F 7/00* | (2006.01) |
| *B01F 5/00* | (2006.01) |

(52) U.S. Cl.
CPC ...... *B01F 3/04248* (2013.01); *B01D 19/0042* (2013.01); *B01D 19/0094* (2013.01);
(Continued)

(58) Field of Classification Search
CPC ........ B01F 3/04; B01F 3/04099; B01D 19/00; B01D 19/0042; B01D 19/0094
(Continued)

(56) References Cited

U.S. PATENT DOCUMENTS 4,802,897 A * 2/1989 Johnson ............. B01D 19/0042
137/136

FOREIGN PATENT DOCUMENTS

| DE | 3334824 A1 * 4/1985 .......... B01F 3/04099 |
|---|---|
| JP | 01-258732 A 10/1989 |

(Continued)

OTHER PUBLICATIONS

Japanese Office Action for Application No. JP 2013-216674, dated Mar. 24, 2017 (12 pages).
(Continued)

*Primary Examiner* — Robert A Hopkins
(74) *Attorney, Agent, or Firm* — Nutter McClennen & Fish LLP; John J. Penny, Jr.

(57) ABSTRACT

A gas-containing liquid generating apparatus according to an aspect of the present invention includes a gas/liquid mixing module configured to mix a gas and a liquid to generate a gas-containing liquid, a first injection module configured to inject the gas-containing liquid supplied from the gas/liquid mixing module, and a second injection module configured to inject the gas-containing liquid supplied from the first injection module to generate bubbles in the gas-containing liquid, wherein the first injection module includes a containing portion configured to contain the gas-containing liquid, a cylindrical portion having a channel configured to inject the gas-containing liquid into the containing portion, and a protruding portion provided on an inner wall surface of the cylindrical portion so as to protrude into the channel.

17 Claims, 17 Drawing Sheets

(52) U.S. Cl.
CPC ...... *B01F 3/04099* (2013.01); *B01F 3/04503* (2013.01); *B01F 3/04531* (2013.01); *B01F 3/04978* (2013.01); *B01F 5/0659* (2013.01); *B01F 5/106* (2013.01); *B01F 7/00891* (2013.01); *B01F 11/025* (2013.01); *B01F 11/0266* (2013.01); *B01F 2005/0017* (2013.01); *B01F 2005/0022* (2013.01)

(58) Field of Classification Search
USPC ............. 261/77; 96/155, 204, 206, 208, 216
See application file for complete search history.

(56) References Cited

FOREIGN PATENT DOCUMENTS

| JP | 10-066850 A | 3/1998 |
|---|---|---|
| JP | 2001-062269 A | 3/2001 |
| JP | 2006-334556 A | 12/2006 |
| JP | 2008-238064 A | 10/2008 |
| JP | 2008-272632 A | 11/2008 |
| JP | 2010-264384 A | 11/2010 |
| JP | 2011-101867 A | 5/2011 |
| JP | 3169658 U | 8/2011 |
| JP | 2011-183350 A | 9/2011 |
| JP | 2011-218308 A | 11/2011 |
| JP | 2012-157806 A | 8/2012 |
| JP | 2012-239790 A | 12/2012 |
| JP | 2013-158756 A | 8/2013 |

OTHER PUBLICATIONS

International Search Report for Application No. PCT/JP2014/075597, dated Jan. 27, 2015 (6 pages).
International Preliminary Report on Patentability for Application No. PCT/JP2014/075597, dated Apr. 21, 2016 (11 pages).

* cited by examiner

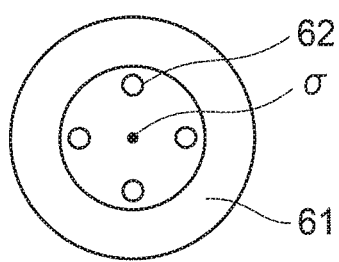
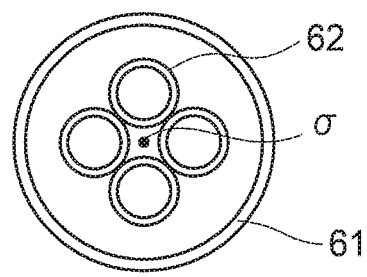
FIG.15A   FIG.15B
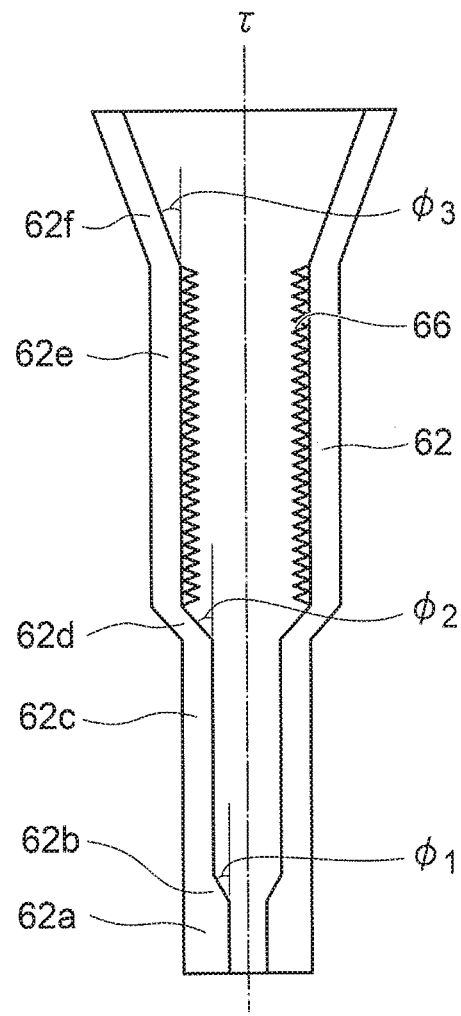
FIG.16

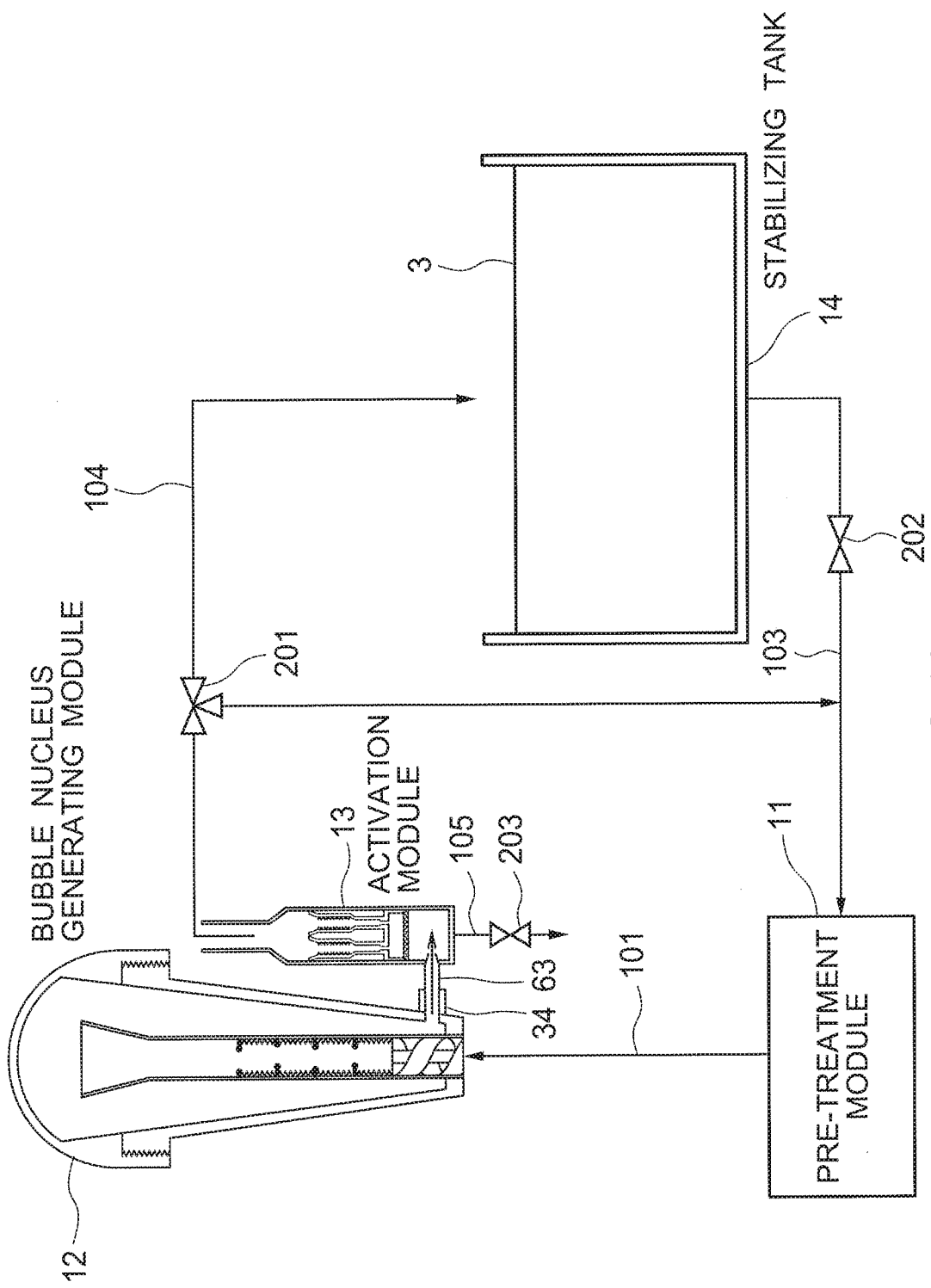

GAS-CONTAINING LIQUID GENERATING APPARATUS AND GAS-CONTAINING LIQUID INJECTING MODULE

CROSS REFERENCE TO RELATED APPLICATIONS

This present application claims priority under 35 U.S.C. § 365 to International Application No. PCT/JP2014/075597, filed on Sep. 26, 2014, which is based upon and claims the benefit of priority under 35 U.S.C. § 119 to Japanese Patent Application No. 2013-216674, filed on Oct. 17, 2013, the entire contents of which are incorporated herein by reference.

BACKGROUND OF THE INVENTION

Field of the Invention

The present invention relates to a gas-containing liquid generating apparatus and a gas-containing liquid injecting module and is applied to, for example, generation of nanobubble water.

Background Art

Recently, microbubble water that contains microbubbles and nanobubble water that contains nanobubbles finer than the microbubbles have attracted attention in various technical fields. There is no clear definition for the microbubbles and the nanobubbles. However, the term "microbubble" generally refers to a bubble having a particle size (diameter) of approximately 1 to 100 μm, while the term "nanobubble" generally refers to a bubble having a particle size (diameter) of less than 1 μm (see Japanese Patent Laid-Open NO. 2011-218308).

PRIOR ART DOCUMENTS

Patent Documents

Patent Document 1:
Japanese Patent Laid-Open NO. 2011-218308

SUMMARY OF THE INVENTION

In general, bubbles such as the microbubbles and the nanobubbles are generated by mixing a gas and a liquid to generate a gas-containing liquid and by injecting the gas-containing liquid. Recent studies have shown that the bubbles are generated such that bubble nuclei are generated in the gas-containing liquid and are then bonded to each other. A bubble nucleus is a collection of gas molecules, which is generated such that the gas molecules before becoming bubbles separate from liquid molecules and gather. It is also known that a large number of fine bubbles such as the nanobubbles can be generated from the gas-containing liquid containing a large number of bubble nuclei.

When the gas-containing liquid is used for various applications, the bubbles are preferably fine, and the gas-containing liquid preferably contains a large number of fine bubbles (that is, contains fine bubbles at high concentration). That is because the fine bubbles last for a long period in the gas-containing liquid. As described above, the gas-containing liquid containing the fine bubbles at high concentration can be generated from the gas-containing liquid containing the bubble nucleus at high concentration. Therefore, it is required to realize a method that can generate a large number of bubble nuclei in the gas-containing liquid and can generate the gas-containing liquid containing the fine bubbles at high concentration.

The present invention has an object to provide a gas-containing liquid generating apparatus and a gas-containing liquid injecting module that can generate the gas-containing liquid containing the fine bubbles at high concentration.

A gas-containing liquid generating apparatus according to an aspect of the present invention includes a gas/liquid mixing module configured to mix a gas and a liquid to generate a gas-containing liquid, a first injection module configured to inject the gas-containing liquid supplied from the gas/liquid mixing module, and a second injection module configured to inject the gas-containing liquid supplied from the first injection module to generate bubbles in the gas-containing liquid, wherein the first injection module includes a containing portion configured to contain the gas-containing liquid, a cylindrical portion having a channel configured to inject the gas-containing liquid into the containing portion, and a protruding portion provided on an inner wall surface of the cylindrical portion so as to protrude into the channel.

The present invention makes it possible to provide the gas-containing liquid generating apparatus and the gas-containing liquid injecting module that can generate the gas-containing liquid containing fine bubbles at high concentration.

BRIEF DESCRIPTION OF THE DRAWINGS

FIGS. 15A to 15B are sectional views illustrating a structure of nozzles in FIG. 14;

FIG. 16 is a sectional view illustrating the structure of the nozzles in FIG. 14;

FIG. 18 is a schematic view illustrating constitution of the gas-containing liquid generating apparatus in a variation of the third embodiment.

DESCRIPTIONS OF THE EMBODIMENTS

Embodiments of the present invention will be described below by referring to the attached drawings.

First Embodiment

Figure 1:
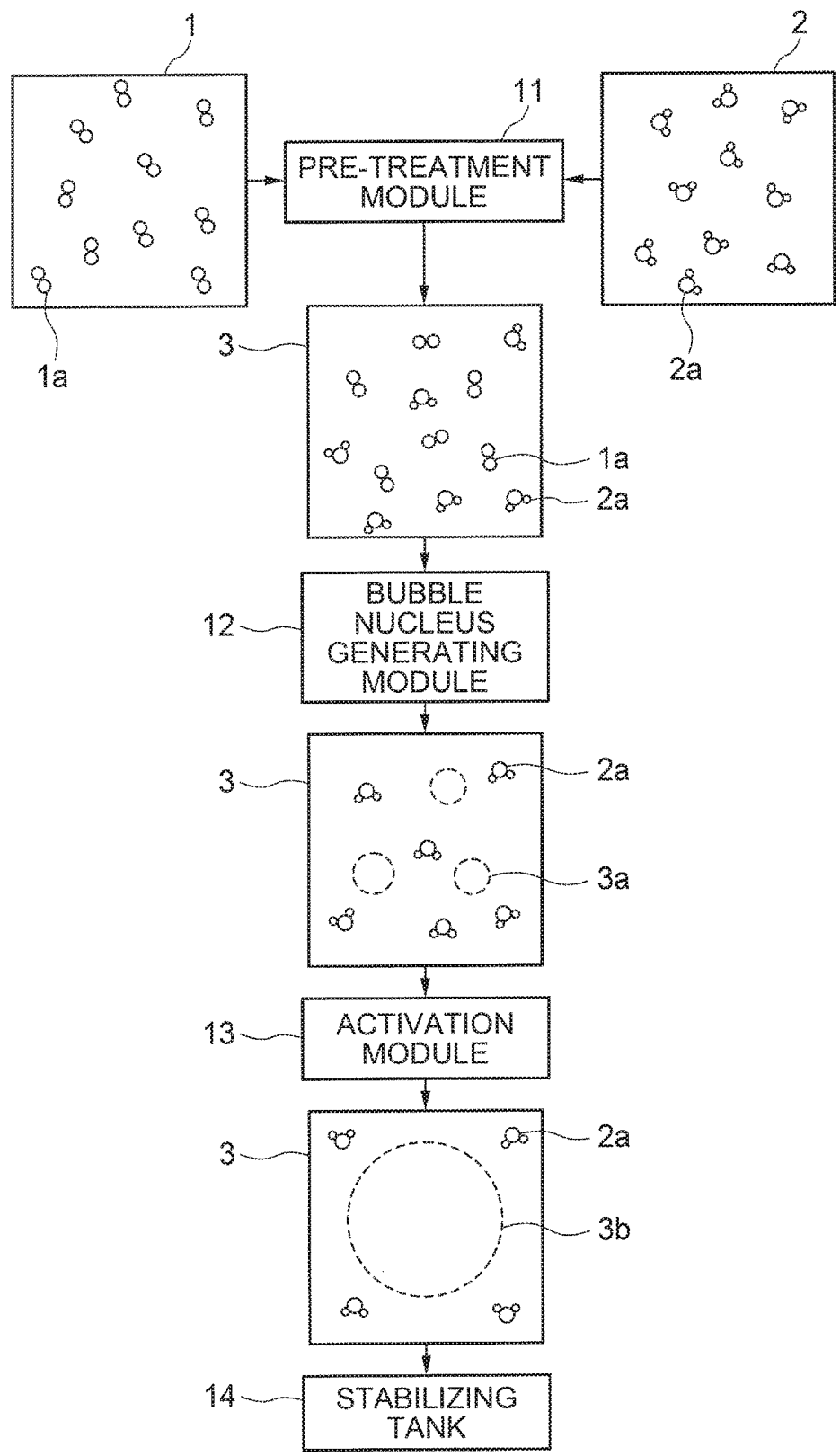
FIG. 1 is a schematic view illustrating constitution of a gas-containing liquid generating apparatus of a first embodiment.

FIG. 1 is a schematic view illustrating constitution of a gas-containing liquid generating apparatus of a first embodiment.

The gas-containing liquid generating apparatus in FIG. 1 includes a pre-treatment module 11 which is an example of a gas/liquid mixing module, a bubble nucleus generating module 12 which is an example of a first injection module, an activation module 13 which is an example of a second injection module, and a stabilizing tank 14. The bubble nucleus generating module 12 and the activation module 13 are also examples of a gas-containing liquid injecting module.

The pre-treatment module 11 generates a gas-containing liquid 3 by mixing a gas 1 and a liquid 2. Examples of the gas 1 include oxygen. Reference character 1a denotes a gas molecule (oxygen molecule, for example). Examples of the liquid 2 include water. Reference character 2a denotes a liquid molecule (water molecule, for example).

The bubble nucleus generating module 12 generates a large number of bubble nuclei 3a in the gas-containing liquid 3 by injecting the gas-containing liquid 3 supplied from the pre-treatment module 11. The bubble nucleus 3a is a collection in which the gas molecules 1a separate from the liquid molecules 2a and gather.

The activation module 13 generates a large number of bubbles 3b in the gas-containing liquid 3 by injecting the gas-containing liquid 3 supplied from the bubble nucleus generating module 12. The bubbles 3b are generated by bonding of the bubble nuclei 3a to each other.

In the stabilizing tank 14, the gas-containing liquid 3 supplied from the activation module 13 is contained. The gas-containing liquid generating apparatus in this embodiment can supply nanobubble water containing nanobubbles each having a particle diameter of 50 to 500 nm at high concentration as the gas-containing liquid 3 in the stabilizing tank 14. Details of this nanobubble water will be described later.

Figure 2A:
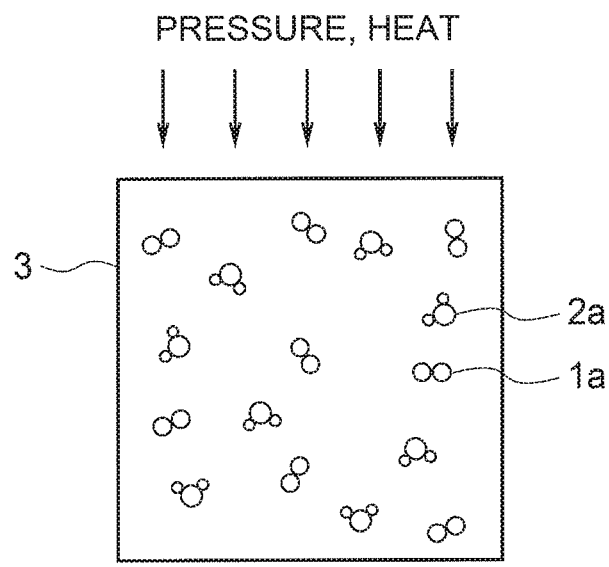
FIGS. 2A to 2C are views for explaining a generating process of bubble nuclei in the first embodiment.
Figure 2B:
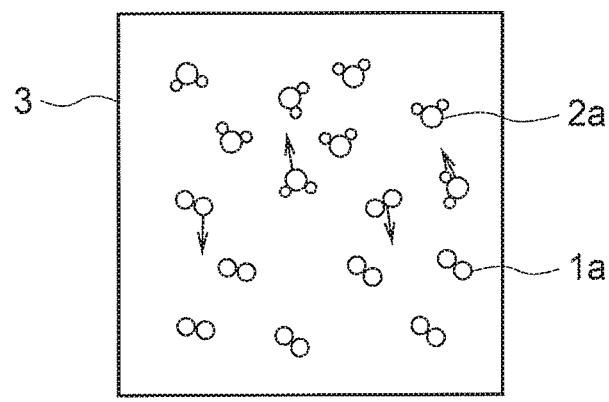
Figure 2C:
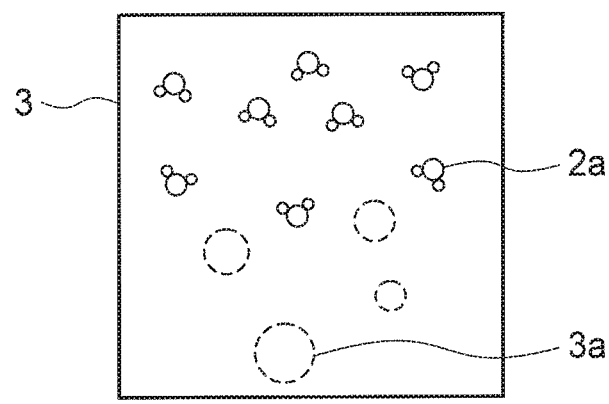

FIGS. 2A to 2C are views for explaining a generating process of the bubble nuclei 3a in the first embodiment.

FIG. 2A illustrates a state in which the gas-containing liquid 3 generated by the pre-treatment module 11 is treated by the bubble nucleus generating module 12.

In general, an amount that the gas 1 is dissolved into the liquid 2 under a condition of a normal temperature/normal pressure has an upper limit determined by types of the gas 1 and the liquid 2. In order to cause the gas 1 in an amount exceeding this upper limit to be dissolved into the liquid 2, the gas 1 needs to be mechanically and forcedly dissolved into the liquid 2 by using a pump or the like. The gas-containing liquid 3 obtained as above is called an oversaturated gas-containing liquid.

It is proved that, when the bubble nucleus 3a is generated in the gas-containing liquid 3, the large number of bubble nucleus 3a can be generated by using the oversaturated gas-containing liquid as the gas-containing liquid 3. The pre-treatment module 11 in this embodiment generates the oversaturated gas-containing liquid as the gas-containing liquid 3. A structure of the pre-treatment module 11 that can generate the oversaturated gas-containing liquid will be described later.

It is also proved that the bubble nucleus 3a is generated by applying pressure fluctuation or thermal fluctuation (temperature fluctuation) to the gas-containing liquid 3. The bubble nucleus generating module 12 in this embodiment generates the bubble nucleus 3a by applying the pressure fluctuation to the gas-containing liquid 3. A structure of the bubble nucleus generating module 12 that can apply the pressure fluctuation to the gas-containing liquid 3 will be described later.

FIG. 2A illustrates a state in which the pressure fluctuation or thermal fluctuation is applied to the gas-containing liquid 3 which is the oversaturated gas-containing liquid. When the pressure fluctuation is applied to the gas-containing liquid 3, a high-pressure portion and a low-pressure portion are generated in the gas-containing liquid 3. When the thermal fluctuation is applied to the gas-containing liquid 3, a high-temperature portion and a low-temperature portion are generated in the gas-containing liquid 3.

In this case, the gas molecules 1a gather in the low-pressure portion or the high-temperature portion. FIG. 2B illustrates a state in which the gas molecules 1a gather in these portions.

As a result, as illustrated in FIG. 2C, the bubble nucleus 3a which is a collection in which the gas molecules 1a gather is generated. According to a simulation of a generating process of the bubble nucleus 3a, the particle diameter of the bubble nucleus 3a is proved to be approximately 0.5 to 1.0 nm.

The structures of the pre-treatment module 11, the bubble nucleus generating module 12, and the activation module 13 in this embodiment will be described below.

(1) Pre-Treatment Module 11 of First Embodiment

Figure 3:
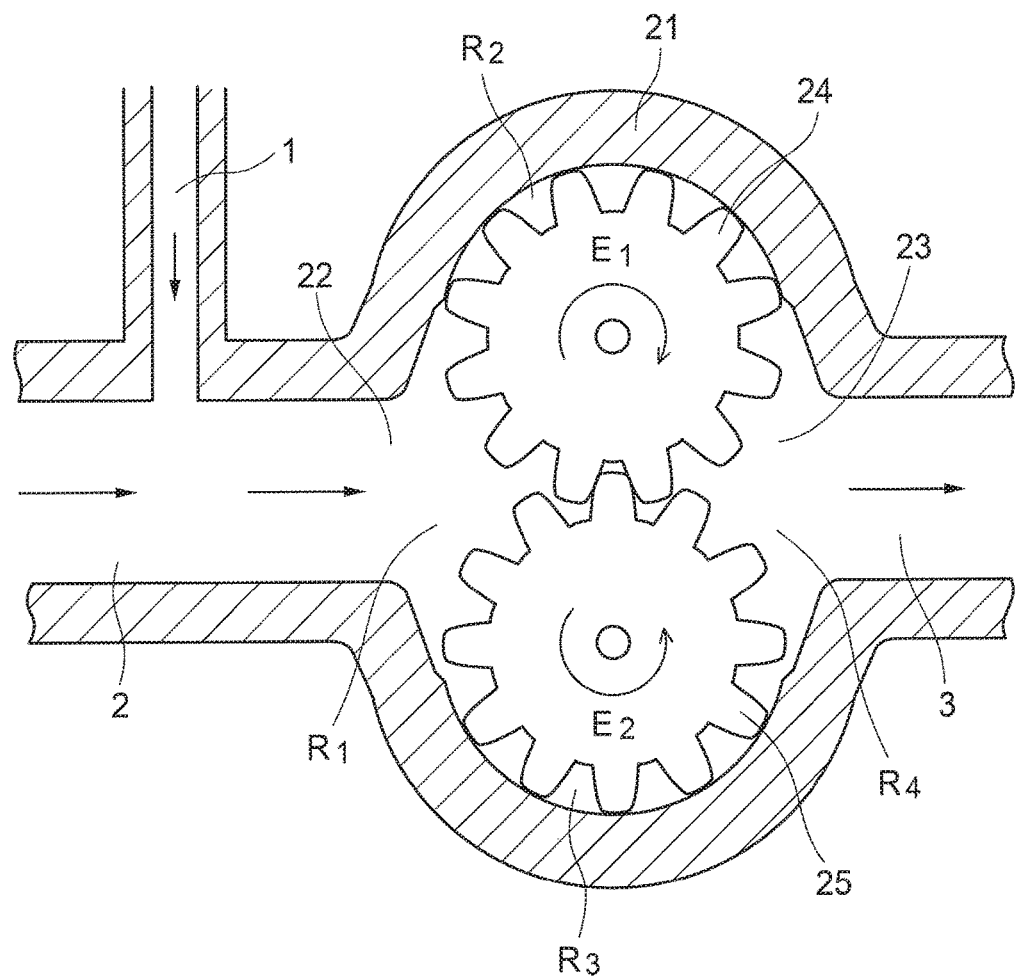
FIG. 3 is a sectional view illustrating a structure of a pre-treatment module in FIG. 1.

FIG. 3 is a sectional view illustrating the structure of the pre-treatment module 11 in FIG. 1.

The pre-treatment module 11 in this embodiment is a gear-driven pump and includes a housing 21, an inlet 22 of the housing 21, an outlet 23 of the housing 21, a driving gear 24 which is an example of a first gear, and a driven gear 25 which is an example of a second gear.

The driving gear 24 and the driven gear 25 are meshed with each other and contained in the housing 21. Arrows $E_1$ and $E_2$ indicate rotating directions of the driving gear 24 and the driven gear 25, respectively.

In this embodiment, a negative pressure region $R_1$ is generated in the inlet 22 by rotations of the driving gear 24 and the driven gear 25. The gas 1 and the liquid 2 are suctioned by an action of this negative pressure and flow into the housing 21 at the same time.

Reference characters $R_2$ indicates a region between the housing 21 and the driving gear 24. The region $R_2$ corresponds to a valley between teeth of the driving gear 24. Reference character $R_3$ indicates a region between the housing 21 and the driven gear 25. The region $R_3$ corresponds to a valley between teeth of the driven gear 25.

The gas 1 and the liquid 2 having flowed into the housing 21 branch into a flow on the driving gear 24 side and a flow on the driven gear 25 side, pass through the regions $R_2$ and $R_3$ and merge again at the outlet 23 and are discharged from the housing 21 as the gas-containing liquid 3. The gas 1 and the liquid 2 are mixed, stirred, and pressurized by actions of the driving gear 24 and the driven gear 25 when passing through the regions $R_2$ and $R_3$. Since insides of the regions $R_2$ and $R_3$ have a high pressure, the gas 1 can be easily dissolved into the liquid 2.

In this embodiment, the flow on the driving gear 24 side and the flow on the driven gear 25 side collide each other at a collision region $R_4$ of the outlet 23 and merge. This collision also acts to promote dissolving of the gas 1 into the liquid 2. The merged gas-containing liquid 3 is discharged from the housing 21 and is pressure-fed to the bubble nucleus generating module 12.

As described above, since the pre-treatment module 11 in this embodiment is a gear-driven pump, it can mechanically and forcedly cause the gas 1 to be dissolved into the liquid 2. Therefore, according to this embodiment, the oversaturated gas-containing liquid can be generated as the gas-containing liquid 3.

Since the pre-treatment module 11 in this embodiment is a gear-driven pump and teeth and valleys of the driving gear 24 and the driven gear 25 alternately appear at the outlet 23, the gas-containing liquid 3 can be pressure-fed intermittently. As a result, wave-like fluctuation is generated in the flow of the pressure-fed gas-containing liquid 3, and a high-pressure portion and a low-pressure portion are generated in the gas-containing liquid 3. This has an effect that the bubble nucleus 3a can be generated easily in the bubble nucleus generating module 12.

Since the pre-treatment module 11 in this embodiment is a gear-driven pump, it is not easily affected by characteristics of the gas 1 or the liquid 2 and a pressure around it as compared with a normal pump, and it has merits that controllability is favorable, the number of components is small, and maintainability is good.

(2) Bubble Nucleus Generating Module 12 of First Embodiment

Figure 4:
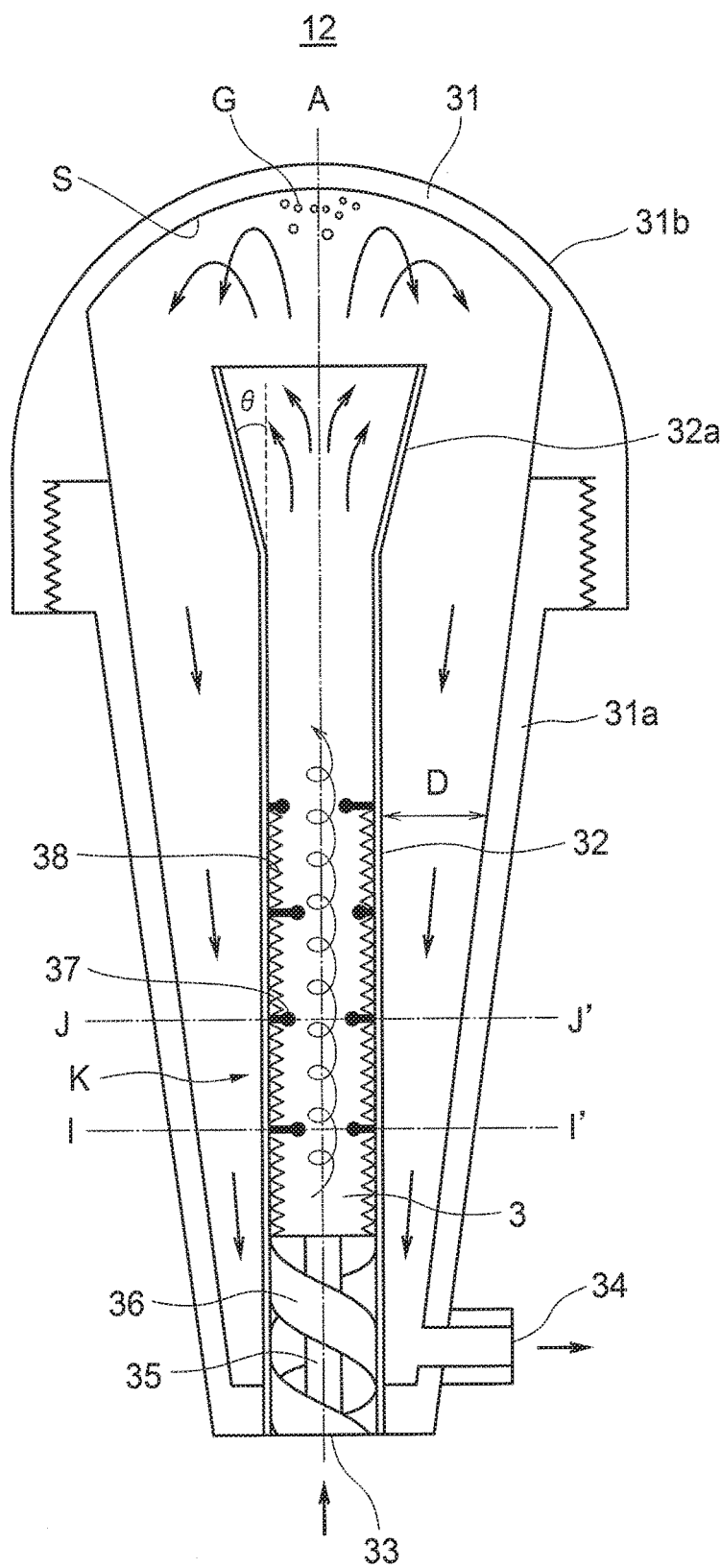
FIG. 4 is a sectional view illustrating a structure of a bubble nucleus generating module in FIG. 1.
Figure 5:
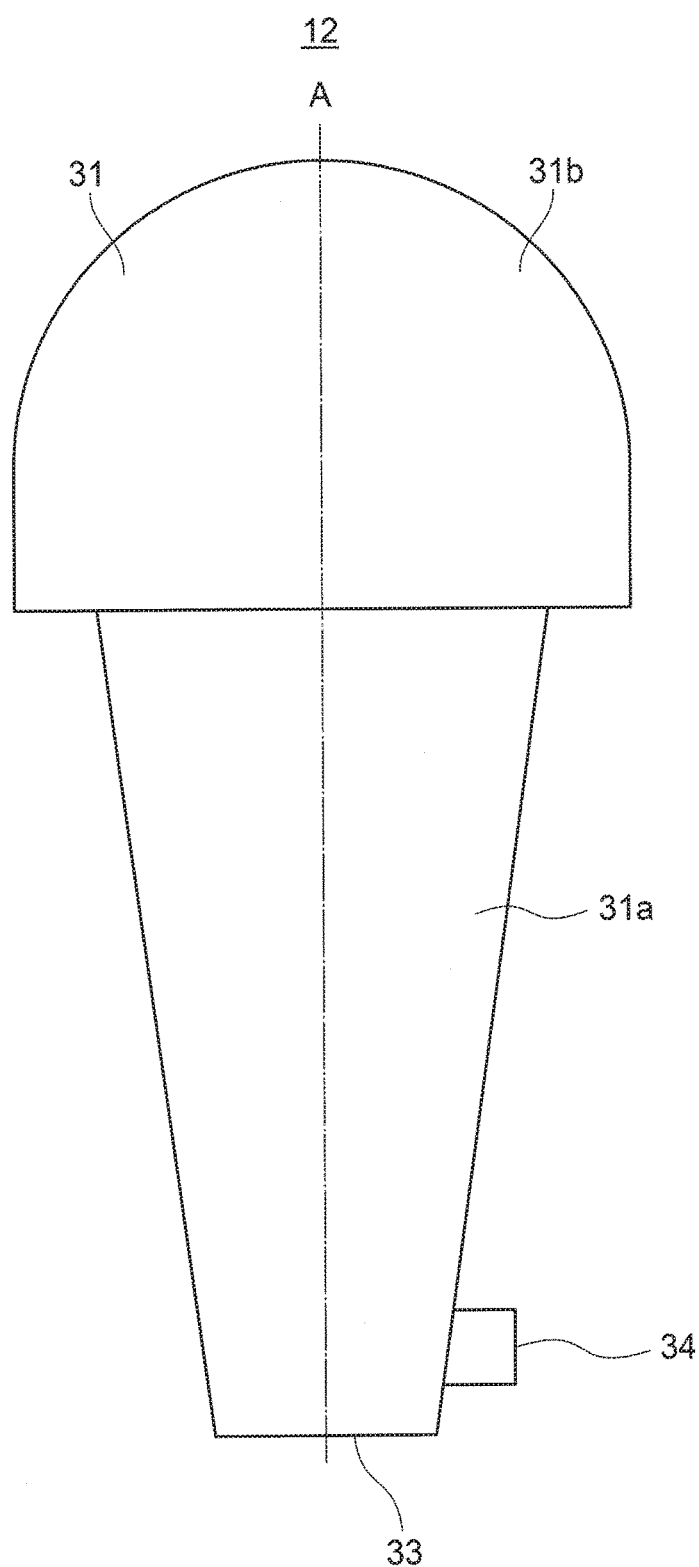
FIG. 5 is a side view illustrating an outer shape of the bubble nucleus generating module in FIG. 1.

FIG. 4 is a sectional view illustrating the structure of the bubble nucleus generating module 12 in FIG. 1. FIG. 5 is a side view illustrating an outer shape of the bubble nucleus generating module 12 in FIG. 1. The structure of the bubble nucleus generating module 12 will be described below by referring to FIG. 4.

The bubble nucleus generating module 12 in this embodiment includes a containing case 31, a cylindrical portion 32, an inlet 33, a outlet 34, a shaft member 35, a spiral channel 36, one or more projections 37, and a groove forming member 38 as illustrated in FIG. 4. The containing case 31 is an example of a containing portion. The projection 37 and the groove forming member 38 are examples of protruding portions.

The containing case 31 is a member that contains the gas-containing liquid 3 and has a lower case 31a which is an example of a first member and an upper case 31b which is an example of a second member.

The lower case 31a is mounted on the cylindrical portion 32 so as to surround an outer wall surface of the cylindrical portion 32, and the cylindrical portion 32 penetrates a bottom portion of the lower case 31a. The lower case 31a includes the outlet 34 that discharges the gas-containing liquid 3 in the vicinity of the bottom portion.

The upper case 31b is mounted on the lower case 31a in the vicinity of a tip of the cylindrical portion 32 and is detachable with respect to the lower case 31a. In this embodiment, by removing the upper case 31b, an inside of the bubble nucleus generating module 12 can be maintained. The cylindrical portion 32 is a member having a channel that injects the gas-containing liquid 3 into the containing case 31. This channel is surrounded by an inner wall surface of the cylindrical portion 32. Reference character A indicates a center axis of the cylindrical portion 32. The cylindrical portion 32 has the inlet 33 that takes in the gas-containing liquid 3 discharged from the pre-treatment module 11 at a terminal end and injects the taken-in gas-containing liquid 3 from the tip.

The cylindrical portion 32 has a flared portion 32a at a tip portion. An inner diameter of the cylindrical portion 32 is substantially uniform as a whole, but the inner diameter of the flared portion 32a is set so as to be widened as it proceeds to a downstream of the channel. The flared portion 32a has a merit that the gas-containing liquid 3 can be injected to a wide range. In this embodiment, an inclination angle θ of the inner wall surface of the flared portion 32a with respect to the center axis A is set to 30 to 60 degrees.

The cylindrical portion 32 is connected to a plurality of the spiral channels 36 in a terminal portion. The spiral channel 36 has a spiral shape by being wound around the shaft member 35. The spiral channel 36 forms a swirling flow of the gas-containing liquid 3 in the cylindrical portion 32 by injecting the gas-containing liquid 3 supplied from the pre-treatment module 11 into the cylindrical portion 32. The swirling flow has an effect that makes it easy for the gas-containing liquid 3 to collide against the projection 37 or the groove forming member 38 and to generate the bubble nucleus 3a.

The projection 37 and the groove forming member 38 are provided on the inner wall surface of the cylindrical portion 32 and protrude to the channel surrounded by the inner wall surface of the cylindrical portion 32. Specifically, the projection 37 protrudes in a rod state toward the channel from the inner wall surface of the cylindrical portion 32. On the other hand, in the groove forming member 38, a groove extending linearly along the inner wall surface of the cylindrical portion 32 is provided, and as a result, a portion between the grooves of the groove forming member 38 protrudes to the channel.

In this embodiment, the gas-containing liquid 3 flowing through the cylindrical portion 32 collides against the projection 37 or the groove forming member 38, whereby pressure fluctuation is generated in the gas-containing liquid 3 and a large number of the bubble nuclei 3a are generated in the gas-containing liquid 3. That is, the projection 37 and the groove forming member 38 in this embodiment have a function of giving the pressure fluctuation to the gas-containing liquid 3.

Figure 6A:
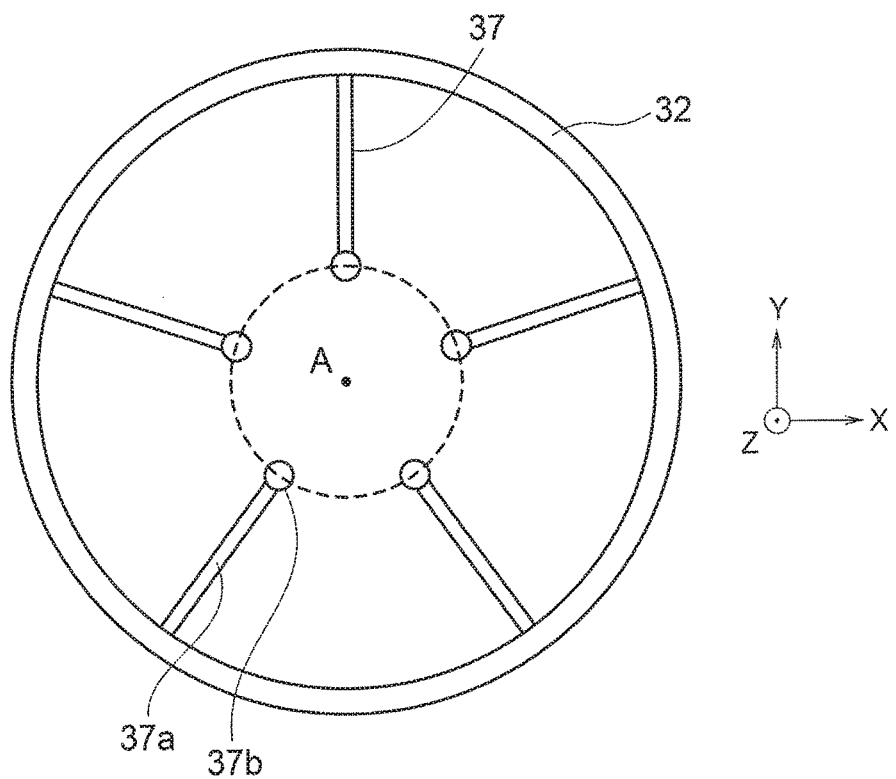
FIGS. 6A to 6B are sectional views illustrating a structure of projections in FIG. 4.
Figure 6B:
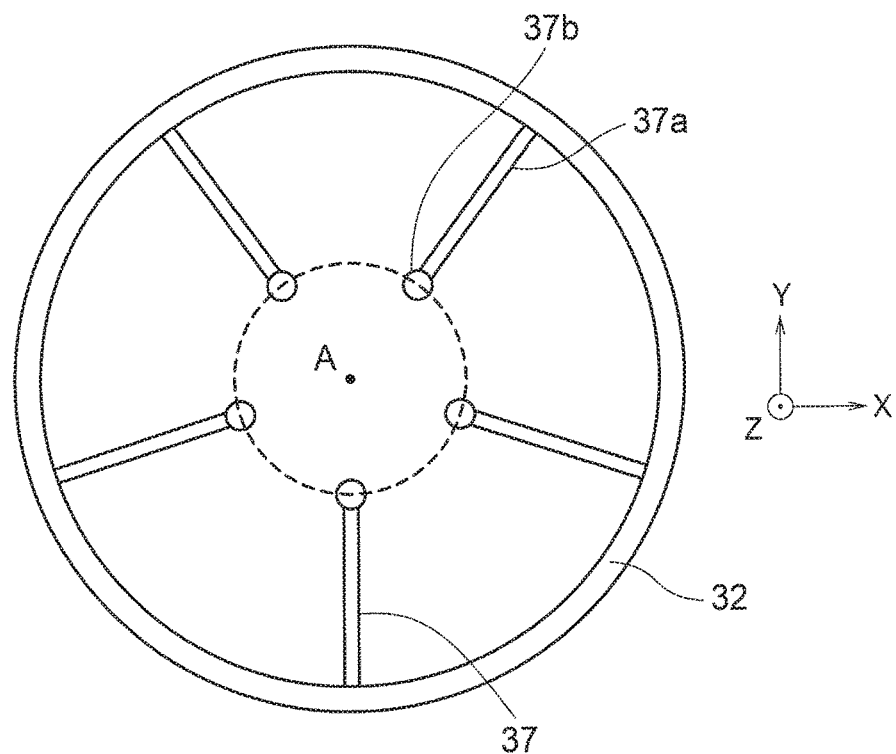

FIGS. 6A to 6B are sectional views illustrating the structure of the projections 37 in FIG. 4.

FIG. 6A illustrates a section perpendicular to an axial direction (direction in parallel with the center axis A) of the cylindrical portion 32 and specifically illustrates a section along an I-I' line in FIG. 4. This section is an example of a first section. FIG. 6A illustrates the Z-direction in parallel with the axial direction and the X-direction and the Y-direction perpendicular to the axial direction and perpendicular to each other.

In the section in FIG. 6A, the plurality of the projections 37 are arranged at equal intervals. These projections 37 are examples of first projections. Each of the projections 37 has a rod-shaped section 37a provided on the inner wall surface of the cylindrical portion 32 and a spherical section 37b provided at a tip of the rod-shaped section 37a. The spherical sections 37b of these projections 37 are arranged on the same circle. The number of the projections 37 in FIG. 6A is set to an odd number (or five, specifically).

FIG. 6B illustrates another section perpendicular to the axial direction of the cylindrical portion 32 and specifically illustrates a section along a J-J' line in FIG. 4. This section is an example of a second section different from the first section.

In the section in FIG. 6B, similarly in the section in FIG. 6A, the plurality of the projections 37 are arranged at equal intervals. These projections 37 are examples of second projections. The structure and the number of the projections 37 in FIG. 6B are similar to the structure and the number of the projections 37 in FIG. 6A.

However, the projections 37 in FIG. 6A and the projections 37 in FIG. 6B are arranged at positions where they do not overlap each other in the axial direction of the cylindrical portion 32. Specifically, in the section in FIG. 6A, one piece of the projection 37 is located in the +Y-direction, while in the section in FIG. 6B, one piece of the projection 37 is located in the −Y-direction. Such arrangement has an effect that, by shifting the positions of the projections 37 in the different sections, the gas-containing liquid 3 can easily collide against the projections 37 and the bubble nucleus 3a can be generated easily.

The cylindrical portion 32 in this embodiment has four sections each having five pieces of the projections 37 as illustrated in FIG. 4 or 20 pieces of the projections 37 in total. The section in FIG. 6A and the section in FIG. 6B are first and second sections, respectively, in these four sections and the sections adjacent to each other. In this embodiment, the projections 37 on the sections adjacent to each other are preferably arranged at positions not overlapped with each other in the axial direction of the cylindrical portion 32. For example, the arrangement in FIG. 6A may be applied to the first and third sections, while the arrangement in FIG. 6B may be applied to the second and fourth sections.

Figure 7:
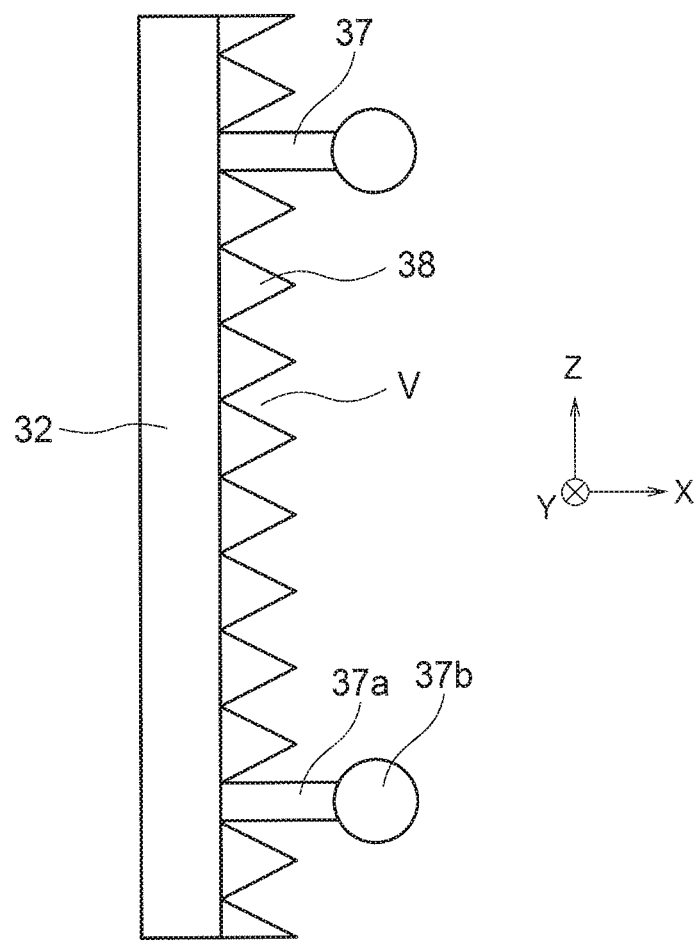
FIG. 7 is a sectional view illustrating a structure of a groove forming member in FIG. 4.

FIG. 7 is a sectional view illustrating a structure of the groove forming member 38 in FIG. 4. FIG. 7 corresponds to an enlarged sectional view of a portion of an arrow K illustrated in FIG. 4.

In the groove forming member 38, one or more grooves V extending linearly along the inner wall surface of the cylindrical portion 32 are provided. A shape of the groove V is annular or spiral, for example. The groove forming member 38 may be formed of the same member as that of the cylindrical portion 32 or may be formed of a member different from that of the cylindrical portion 32. The groove V may penetrate the groove forming member 38 or does not have to penetrate the groove forming member 38. In this embodiment, a height from the inner wall surface of the cylindrical portion 32 to a top portion of the groove forming member 38 is set lower than a height from the inner wall surface of the cylindrical portion 32 to the top portion of the projection 37.

Here, a mechanism by which the bubble nucleus 3a is generated by an action of the groove forming member 38 will be described. If the gas-containing liquid 3 flowing at a high speed collides against the groove forming member 38, hydrogen bond between the liquid molecules (water molecules) 2a is cut off, and the gas molecules (oxygen molecules) 1a contained by the hydrogen bond are released. As a result, the released gas molecules 1a gather, and the bubble nuclei 3a are generated. Collision heat (friction heat) generated when the gas-containing liquid 3 collides against the groove forming member 38 contributes to a motion of the gas molecule 1a for the gas molecules 1a to gather with each other.

Next, by referring to FIG. 4 again, description of the structure of the bubble nucleus generating module 12 is resumed.

Reference character S denotes an inner wall surface of the upper case 32b. In this embodiment, a shape of the inner wall surface S of the upper case 32b in the vicinity of the tip of the cylindrical portion 32 is a concave curved surface. A shape of the curved surface is semispherical, for example. The inner wall surface S of the upper case 32b functions as an reversing wall against which the gas-containing liquid 3 injected from the cylindrical portion 32 collides and is reversed.

Reference character G denotes an excess gas collecting in the vicinity of the inner wall surface S of the upper case 32b. In this embodiment, since the shape of the inner wall surface S is the concave curved surface, the excess gas G collects in the vicinity of a top portion of the inner wall surface S, that is, in the vicinity of the center axis A. However, a region in the vicinity of the top portion of the inner wall surface S is a region where the gas-containing liquid 3 injected from the cylindrical portion 32 hits the strongest. Therefore, the excess gas G collecting in the vicinity of the inner wall surface S is taken in a reversing flow of the gas-containing liquid 3 and is dissolved again into the gas-containing liquid 3.

Therefore, according to this embodiment, since remaining of the excess gas G in the vicinity of the inner wall surface S of the upper case 32b for long time can be suppressed, it is no longer necessary to install a valve for discharging the excess gas G on the bubble nucleus generating module 12.

According to this embodiment, since it is no longer necessary to retain the excess gas G in the vicinity of the inner wall surface S of the upper case 32b and to discharge it, an installation angle of the bubble nucleus generating module 12 can be arbitrarily set. For example, the bubble nucleus generating module 12 may be installed laterally so that the upper case 31b and the lower case 31a may be arranged at the same height. Alternatively, the bubble nucleus generating module 12 may be installed upside down so that the upper case 31b is arranged on a lower side and the lower case 31a is arranged on an upper side.

Provision of the flared portion 32a at the tip portion of the cylindrical portion 32 also has a merit that the excess gas G can be taken in by the reversing flow more easily.

In this embodiment, a gap between the outer wall surface of the cylindrical portion 32 and an inner wall surface of the lower case 31a functions as a channel for the gas-containing liquid 3 injected from the cylindrical portion 32. The gas-containing liquid 3 flowing through this channel contains the bubble nucleus 3a generated in the cylindrical portion 32 and the like at high concentration.

In this embodiment, a distance D between the outer wall surface of the cylindrical portion 32 and the inner wall surface of the lower case 31a is set so as to be narrowed as it proceeds to the downstream of the channel. Such setting has an effect that a higher pressure is applied to the gas-containing liquid 3 as the gas-containing liquid 3 flows to the downstream. This works effectively for holding of the bubble nucleus 3a.

The gas-containing liquid 3 flowing through this channel is discharged as a high-pressure flow from the outlet 34 provided in the vicinity of the bottom portion of the lower case 31a and is supplied to the activation module 13.

Figure 8:
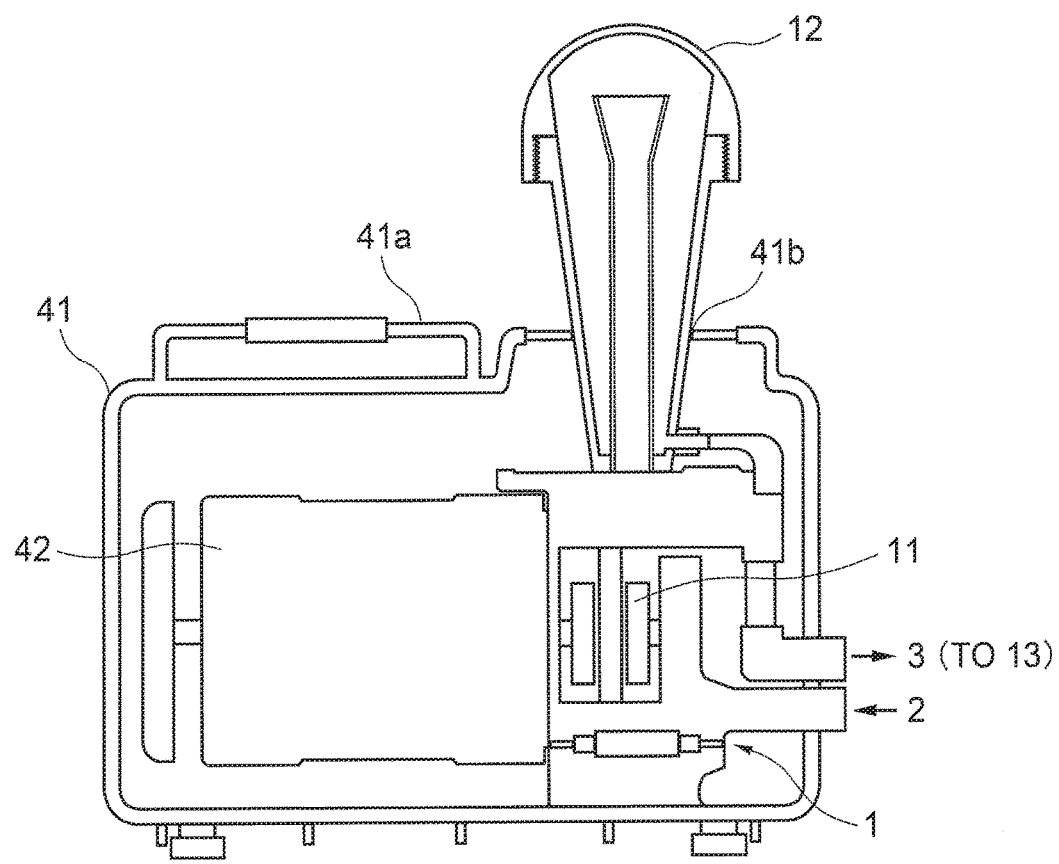
FIG. 8 is a sectional view schematically illustrating a structure of an apparatus in which the pre-treatment module and the bubble nucleus generating module in the first embodiment are integrated.

FIG. 8 is a sectional view schematically illustrating a structure of an apparatus in which the pre-treatment module 11 and the bubble nucleus generating module 12 of the first embodiment are integrated.

The apparatus in FIG. 8 includes a housing 41 having a handle 41a and an opening section 41b and a driving motor 42 contained in the housing 41. The pre-treatment module 11 is contained in the housing 41 and is connected to the driving motor 42. On the other hand, the bubble nucleus generating module 12 is connected to the pre-treatment module 11 in the housing 41 through the opening section 41b of the housing 41. The bubble nucleus generating module 12 is preferably detachable with respect to the pre-treatment module 11.

The structure of FIG. 8 has a merit that the pre-treatment module 11 and the bubble nucleus generating module 12 can be arranged within a short distance. As a result, treatment by the bubble nucleus generating module 12 can be performed so as to generate a large number of bubble nuclei 3a before a contained gas amount or a liquid pressure in the gas-containing liquid 3 discharged from the pre-treatment module 11 lowers.

(3) Activation Module 13 of First Embodiment

Figure 9:
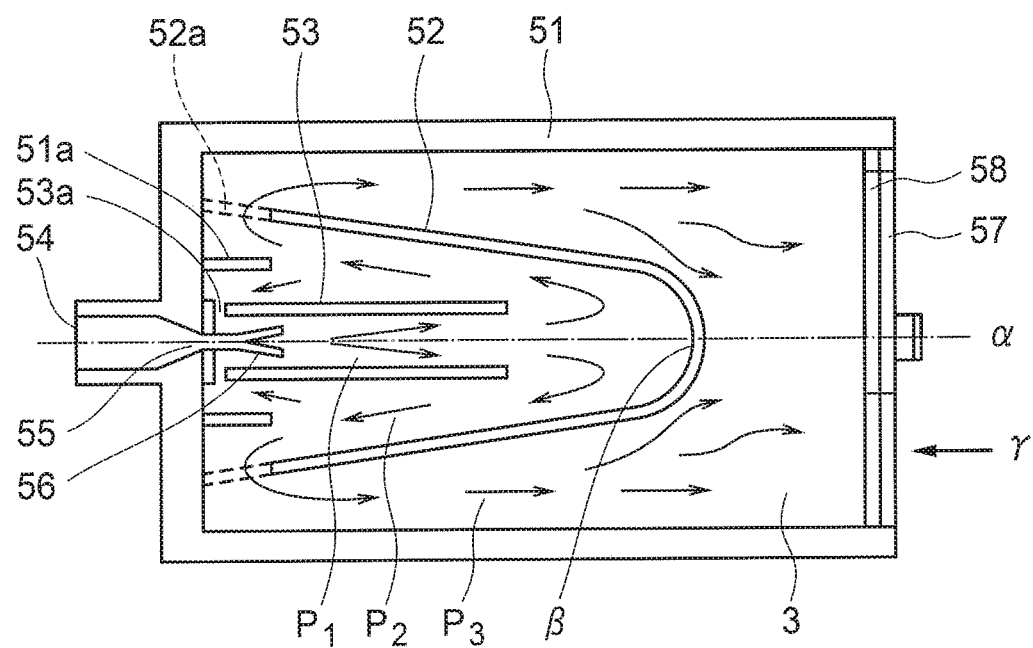
FIG. 9 is a sectional view illustrating a structure of an activation module in FIG. 1.

FIG. 9 is a sectional view illustrating a structure of the activation module 13 in FIG. 1.

The activation module 13 in this embodiment includes an outer case 51, an inner case 52, a cylindrical portion 53, an inlet 54, an injection port 55, a foaming nozzle 56, a front-surface pressure control lid 57, and a rear-surface pressure control lid 58.

The outer case 51 and the inner case 52 are members for containing the gas-containing liquid 3. Each of the outer case 51 and the inner case 52 has a cylindrical shape having one end portion closed and the other end portion open. The inner case 52 is arranged in the outer case 51 so that a closed end of the outer case 51 is adjacent to an open end of the inner case 52.

The cylindrical portion 53 is a member having a channel that injects the gas-containing liquid 3 into the inner case 52. The cylindrical portion 53 penetrates the closed end of the outer case 51, and the cylindrical portion 53 in the outer case 51 is surrounded by the inner case 52. The cylindrical portion 53 has the inlet 54 for taking in the gas-containing liquid 3 discharged from the bubble nucleus generating module 12 at its terminal end and injects the taken-in gas-containing liquid 3 from a distal end. Reference character $\alpha$ denotes a center axis of the cylindrical portion 53.

The cylindrical portion 53 has the injection port 55 located on the downstream of the inlet 54 and one or more foaming nozzles 56 connected to the downstream side of the injection port 55 at the terminal end portion. An inner diameter in the vicinity of the injection port 55 is set narrower than the inner diameter of the cylindrical portion 53. An inner diameter of the foaming nozzle 56 is set smaller than the inner diameter of the injection port 55. Therefore, the gas-containing liquid 3 taken in from the inlet 54 is injected from the injection port 55 and then, discharged from the foaming nozzle 56 into the cylindrical portion 53. At this discharge, the bubbles 3b are generated in the gas-containing liquid 3.

The gas-containing liquid 3 taken in from the inlet 54 flows from a first pressure chamber $P_1$ to a second pressure chamber $P_2$ and further flows from the second pressure chamber $P_2$ to a third pressure chamber $P_3$. The first pressure chamber $P_1$ is a region surrounded by an inner wall surface of the cylindrical portion 53. The second pressure chamber $P_2$ is a region between an outer wall surface of the cylindrical portion 53 and an inner wall surface of the inner case 52. The third pressure chamber $P_3$ is a region between an outer wall surface of the inner case 52 and an inner wall surface of the outer case 51.

The pressure of the gas-containing liquid 3 gently lowers while passing through the second and third pressure chambers $P_2$ and $P_3$. Therefore, the concentration and particle size of the bubbles 3b in the gas-containing liquid 3 are made stable during passage through the second and third pressure chambers $P_2$ and $P_3$. As described above, the bubbles 3b in the gas-containing liquid 3 are generated mainly in the first pressure chamber $P_1$ and refined in the second and third pressure chambers $P_2$ and $P_3$.

Reference character $\beta$ denotes the inner wall surface of the inner case 52 in the vicinity of the tip in the cylindrical portion 53. A shape of the inner wall surface $\beta$ is a concave curved surface. The gas-containing liquid 3 injected from the cylindrical portion 53 collides against the inner wall surface $\beta$ and is reversed. The gas-containing liquid 3 before colliding against the inner wall surface $\beta$ contains the microbubbles and the nanobubbles, but the microbubbles are crushed at this collision and become nanobubbles.

As described above, collision of the gas-containing liquid 3 against the inner wall surface $\beta$ has an action of lowering the concentration of the microbubbles in the gas-containing liquid 3. It is known that crushing of the microbubbles has a sterilization action and a decomposition action of organic substances. Therefore, it can be applied to the activation module 13 in this embodiment or sterilization and decomposition of organic substances.

Reference character 51a denotes a cylindrical wall provided on the inner wall surface on the closed end of the outer case 51. The cylindrical wall 51a is arranged between the inner case 52 and the cylindrical portion 53.

Reference character 52a denotes a notched channel provided in the vicinity of the open end of the inner case 52. The second pressure chamber $P_2$ and the third pressure chamber $P_3$ are connected through the notched channel 52a.

Reference character 53a denotes a through hole with a small diameter provided in the cylindrical portion 53 in the vicinity of the closed end of the outer case 51. The through hole 53a is formed between the tip of the injection port 55 and the tip of the foaming nozzle 56.

The cylindrical wall 51a is arranged between the notched channel 52a and the through hole 53a.

The front-surface pressure control lid 57 and the rear-surface pressure control lid 58 are mounted on the open end of the outer case 51 in an overlapped manner. A method of using these pressure control lids 57 and 58 will be described by referring to FIGS. 10A to 10B.

Figure 10A:
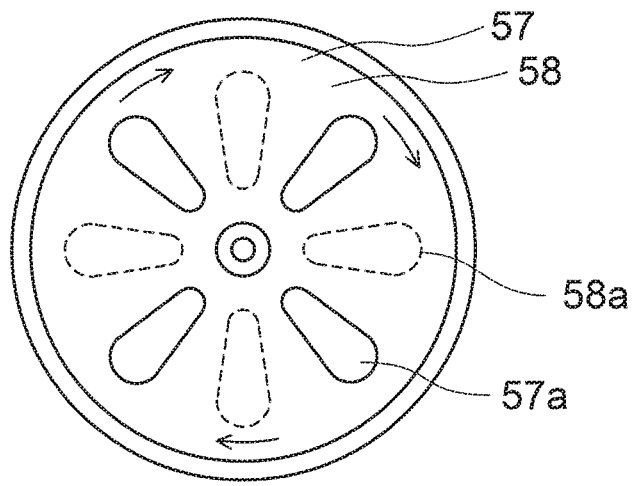
FIGS. 10A to 10B are views for explaining a method of using a pressure control lids in FIG. 9.
Figure 10B:
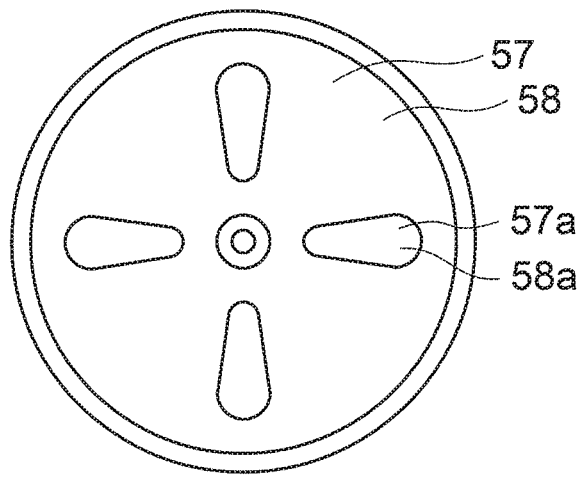

FIGS. 10A to 10B are views for explaining a method of using the pressure control lids 57 and 58 in FIG. 9. FIGS. 10A to 10B illustrate a state of the activation module 13 in FIG. 9 seen in a $\gamma$-direction.

FIG. 10A illustrates the pressure control lids 57 and 58 when they are fully closed. The front-surface pressure control lid 57 has a plurality of (or four, here) openings 57a extending radially. The rear-surface pressure control lid 58 has openings 58a each having the same shape and the same number as those of the front-surface pressure control lid 57. The front-surface pressure control lid 57 is rotatable with respect to the rear-surface pressure control lid 58. When the pressure control lids 57 and 58 are fully closed, the front-surface pressure control lid 57 is rotated with respect to the rear-surface pressure control lid 58 so that the openings 57a and the openings 58a do not overlap each other.

FIG. 10B illustrates the pressure control lids 57 and 58 when they are fully open. When the pressure control lids 57 and 58 are fully open, the front-surface pressure control lid 57 is rotated with respect to the rear-surface pressure control lid 58 so that the openings 57a and the openings 58a fully overlap each other.

When the pressure control lids 57 and 58 are partially open, the front-surface pressure control lid 57 is rotated with respect to the rear-surface pressure control lid 58 so that the openings 57a and the openings 58a partially overlap. In this way, the pressure in the activation module 13 can be made controllable, whereby the concentration and particle size of the bubbles 3b in the gas-containing liquid 3 can be controlled.

The gas-containing liquid 3 discharged from the pressure control lids 57 and 58 of the activation module 13 is stored in the stabilizing tank 14.

Figure 11:
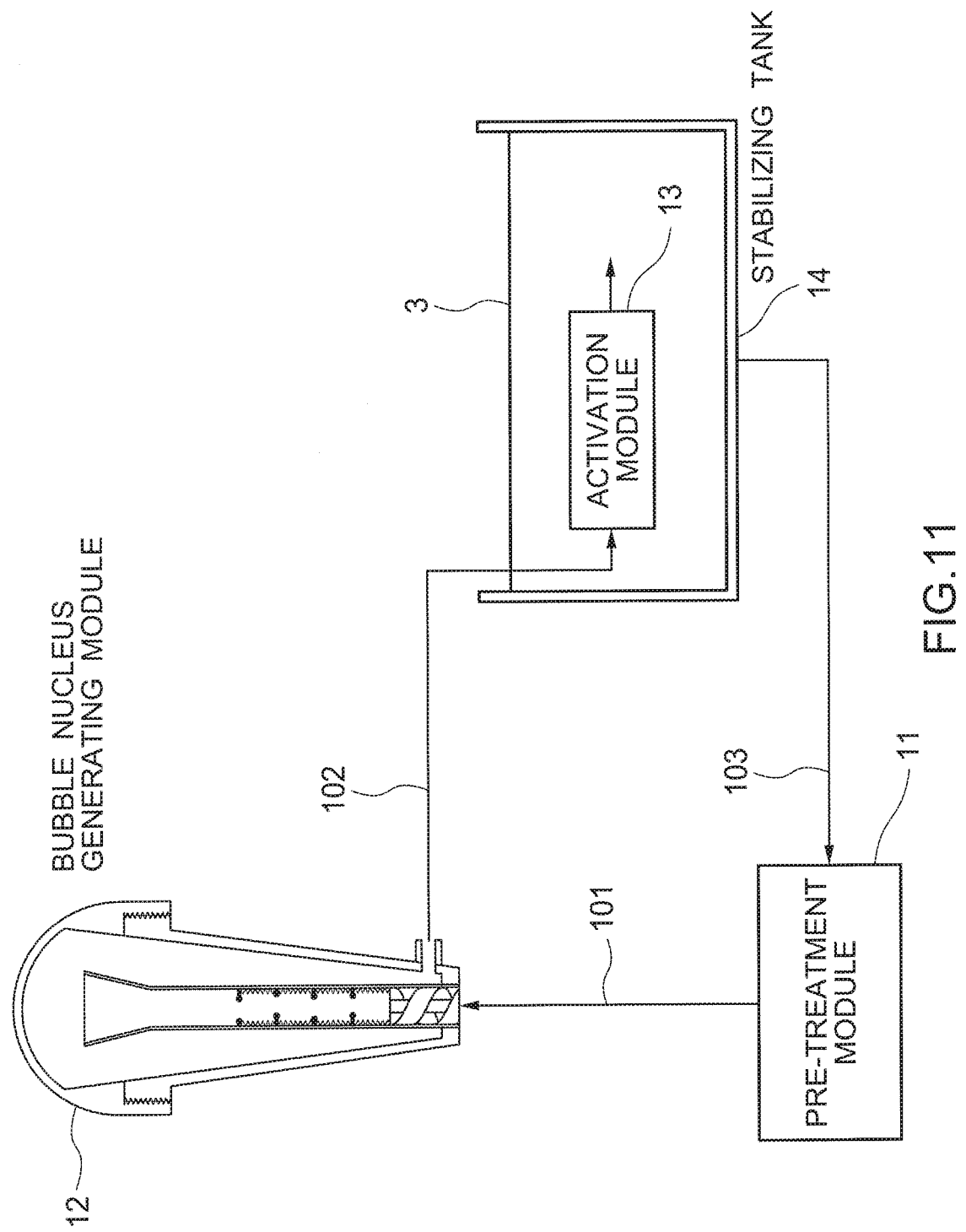
FIG. 11 is a schematic view illustrating constitution of the gas-containing liquid generating apparatus in the first embodiment.

FIG. 11 is a schematic view illustrating constitution of the gas-containing liquid generating apparatus in the first embodiment.

The gas-containing liquid generating apparatus in this embodiment includes channels 101, 102, and 103 through which the gas-containing liquid 3 is made to flow as illustrated in FIG. 11.

The channel 101 connects the outlet 23 of the pre-treatment module 11 and the inlet 33 of the bubble nucleus generating module 12. The channel 102 connects the outlet 34 of the bubble nucleus generating module 12 and the inlet 54 of the activation module 13. On the other hand, since the activation module 13 in this embodiment is arranged in the stabilizing tank 14, a channel connecting the activation module 13 and the stabilizing tank 14 is not provided. The activation module 13 discharges the gas-containing liquid 3 into the stabilizing tank 14 from its pressure control lids 57 and 58.

The channel 103 is a channel that supplies the gas-containing liquid 3 discharged from the stabilizing tank 14 to the inlet 22 of the pre-treatment module 11. By using this channel 103, the gas-containing liquid 3 can be supplied again to the pre-treatment module 11, and the new gas 1 and the gas-containing liquid 3 can be mixed in the pre-treatment module 11. Therefore, according to this embodiment, the gas-containing liquid 3 can be repeatedly circulated through the pre-treatment module 11, the bubble nucleus generating module 12, the activation module 13, and the stabilizing tank 14 in this order. According to this embodiment, concentration of the bubbles 3b in the gas-containing liquid 3 can be improved by such circulation processing.

(4) Bubbles 3b in Gas-Containing Liquid 3 of First Embodiment

Figure 12:
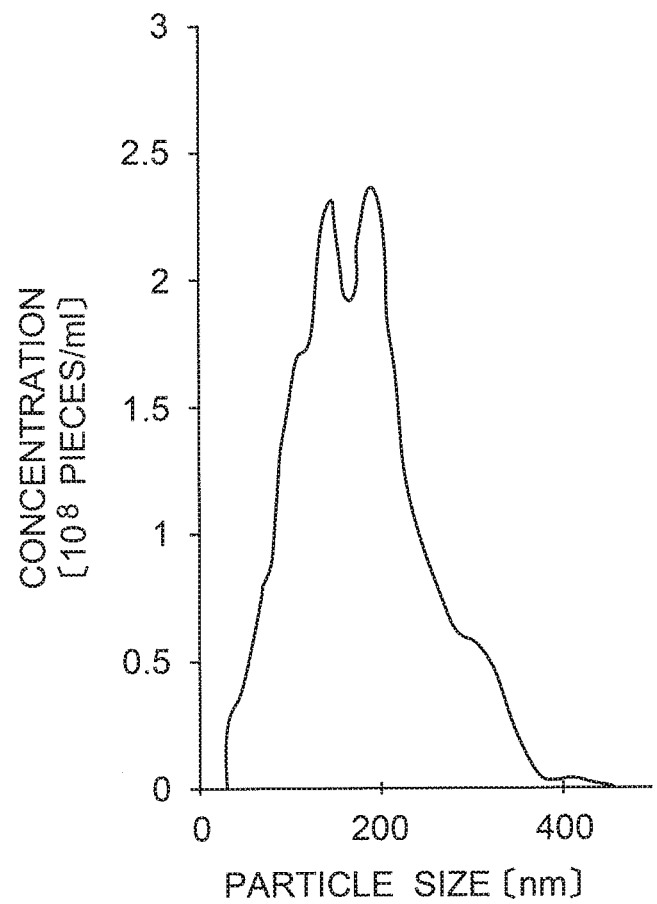
FIG. 12 is a graph illustrating an example of particle diameter distribution of the bubbles generated by the gas-containing liquid generating apparatus in FIG. 1.

FIG. 12 is a graph illustrating an example of particle size distribution of the bubbles 3b generated by the gas-containing liquid generating apparatus in FIG. 1. FIG. 12 illustrates particle size distribution of the bubbles 3b in the gas-containing liquid 3 stored in the stabilizing tank 14. The gas 1 and the liquid 2 are oxygen and water, here.

In general, the nanobubble refers to a bubble having a particle size less than 1 μm. However, according to this embodiment, as illustrated in FIG. 12, it was found that nanobubbles having the particle size of 50 to 500 nm and finer than general nanobubbles can be generated. According to this embodiment, as illustrated in FIG. 12, it was found that the fine nanobubbles with the particle size of 100 to 200 nm can be generated at high concentration. One of factors for that is considered to be generation of the bubble nucleus 3a at high concentration in the bubble nucleus generating module 12. It was also found that these nanobubbles have preferable characteristics that an internal pressure is high, a holding amount of zeta charges is large, thermal fluctuation hardly occurs and the like.

As described above, the gas-containing liquid generating apparatus in this embodiment includes the pre-treatment module 11, the bubble nucleus generating module 12, and the activation module 13, and the bubble nucleus generating module 12 includes protruding portions (projections 37 and groove forming members 38) protruding to the channel from the inner wall surface of the cylindrical portion 32.

Therefore, according to this embodiment, the large number of bubble nuclei 3a can be generated in the gas-containing liquid 3, and the gas-containing liquid 3 containing the fine bubbles 3b at high concentration can be generated.

Second Embodiment

Figure 13:
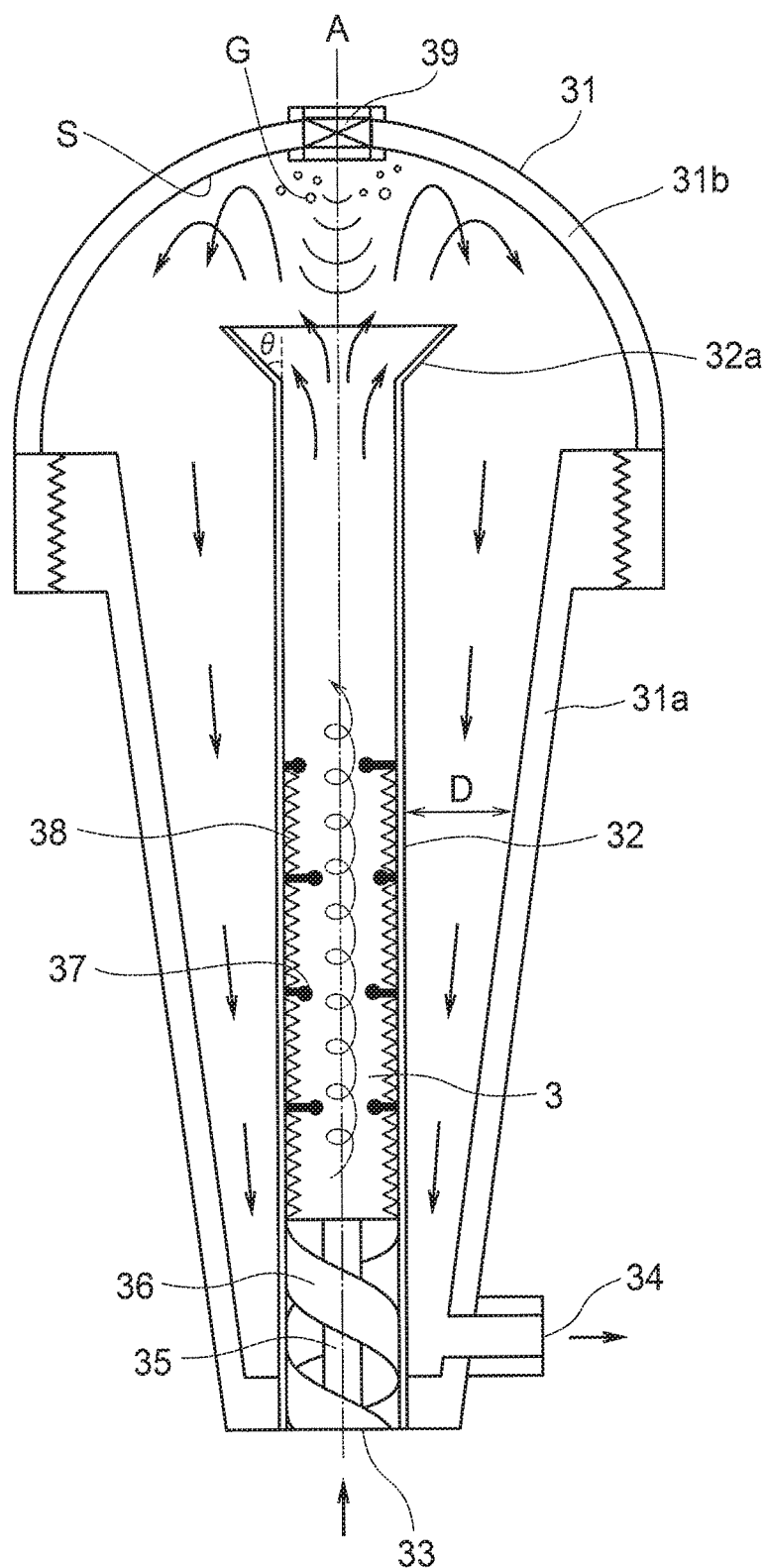
FIG. 13 is a sectional view illustrating a structure of a bubble nucleus generating module of a second embodiment.

FIG. 13 is a sectional view illustrating the structure of the bubble nucleus generating module 12 in a second embodiment.

The bubble nucleus generating module 12 in FIG. 13 includes an ultrasonic oscillator 39 in addition to the constituent elements illustrated in FIG. 4. The ultrasonic oscillator 39 is mounted on the upper case 32b in the vicinity of the tip of the cylindrical portion 32.

The ultrasonic oscillator 39 oscillates ultrasonic waves into the gas-containing liquid. As a result, the excess gas G collecting in the vicinity of the inner wall surface S of the upper case 32b is irradiated with the ultrasonic waves, whereby dissolving of the excess gas G into the gas-containing liquid 3 is promoted. Moreover, separation of the gas 1 and the liquid 2 is promoted by an action of the ultrasonic waves, and more bubble nuclei 3a can be generated.

As described above, according to this embodiment, by providing the ultrasonic oscillator 39 in the bubble nucleus generating module 12, the performance of the gas-containing liquid generating apparatus of generating the bubble nucleus 3a and the bubble 3b can be further improved.

Third Embodiment

Figure 14:
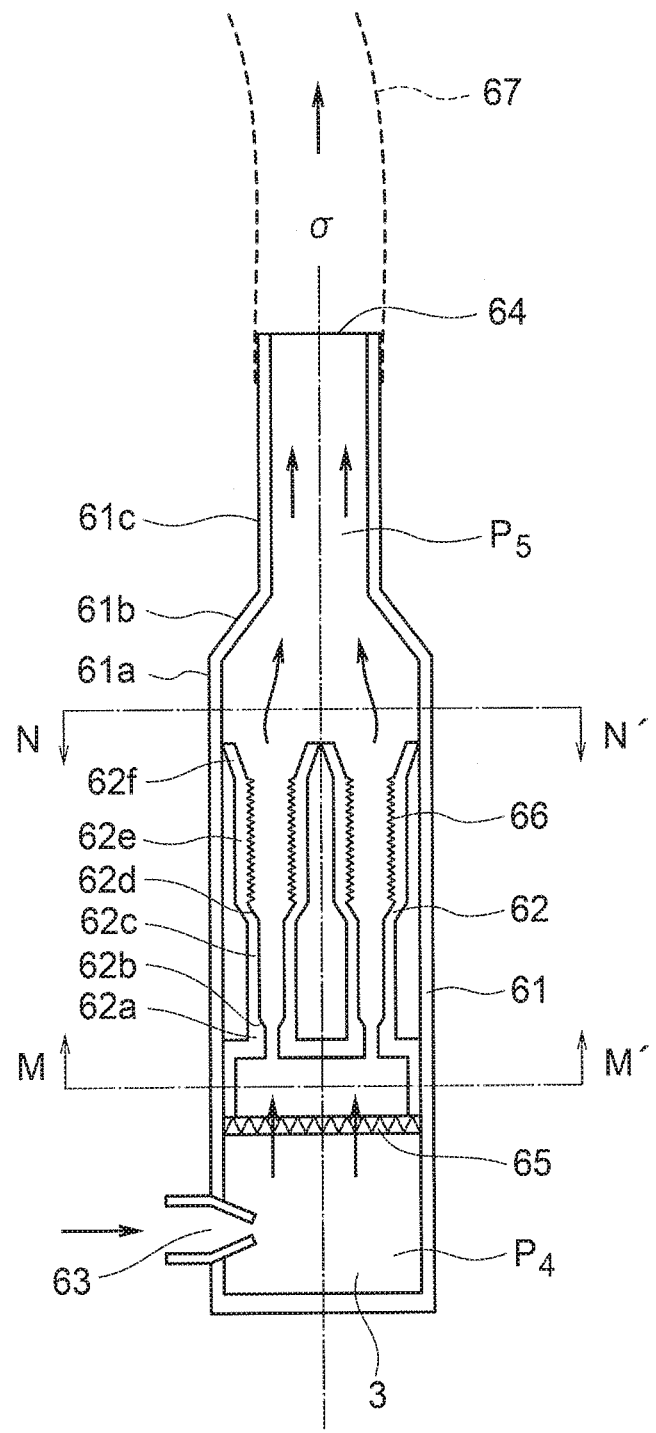
FIG. 14 is a sectional view illustrating a structure of an activation module in a third embodiment.

FIG. 14 is a sectional view illustrating the structure of the activation module 13 of a third embodiment.

The activation module 13 in FIG. 14 includes a containing case 61 which is an example of the containing portion, one or more nozzles 62, an inlet 63, an outlet 64, a filter 65, and a groove forming member 66 which is an example of the protruding portion.

The containing case 61 is a member that contains the gas-containing liquid 3. The containing case 61 includes a cylindrical first containing portion 61a having a first inner diameter, a cylindrical second containing portion 61c located on the downstream side of the first containing portion 61a and having a second inner diameter smaller than the first inner diameter, and a tapered connecting portion 61b that connects the first containing portion 61a and the second containing portion 61c. Reference character σ denotes a center axis of the containing case 61.

The containing case 61 has an inlet 63 that takes in the gas-containing liquid 3 discharged from the bubble nucleus generating module 12 in the first containing portion 61a and an outlet 64 that discharges the taken-in gas-containing liquid 3 to the stabilizing tank 14 in the second containing portion 61c. The inlet 63 in this embodiment is constituted, capable to be directly and detachably attached to the outlet 34 of the bubble nucleus generating module 12. On the other hand, the outlet 64 in this embodiment is constituted so that a tube 67 that feeds the gas-containing liquid 3 to the stabilizing tank 14 can be detachably attached. The tube 67 may be replaced by another member (a pipe, for example) for liquid-feeding.

The nozzle 62 is a member having a channel that injects the gas-containing liquid 3 into the containing case 61.

Specifically, the nozzle 62 is arranged in the first containing portion 61a and injects the gas-containing liquid 3 taken in from the inlet 63 to the outlet 64 side. The channel in the nozzle 62 is surrounded by an inner wall surface of the nozzle 62. The filter (foam sizing net) 65 is installed between the nozzle 62 and the inlet 63.

Each of the nozzles 62 of the activation module 13 is a multi-stage nozzle and includes a cylindrical first stage 62a having a first inner diameter, a cylindrical second stage 62c located on the downstream side of the first stage 62a and having a second inner diameter larger than the first inner diameter, and a cylindrical third stage 62e located on the downstream side of the second stage 62c and having a third inner diameter larger than the second inner diameter. That is, each of the nozzles 62 of the activation module 13 includes the first to third stages 62a, 62c, and 62e in order from the upstream of the channel, and the first to third inner diameters of the first to third stages 62a, 62c, and 62e are set so that the inner diameter becomes larger as it proceeds to the stage on the downstream of the channel. A ratio among the first, second, and third inner diameters is set to 7:10:15, for example.

Each of the nozzles 62 further includes a first flared portion 62b having a taper shape connecting the first stage 62a and the second stage 62c, a second flared portion 62d having a taper shape connecting the second stage 62c and the third stage 62e, and a third flared portion 62f provided on the downstream side of the third stage 62e.

The groove forming member 66 is provided on the inner wall surface of the nozzle 62 and protrudes to the channel surrounded by the inner wall surface of the nozzle 62. Specifically, one or more grooves extending linearly along the inner wall surface of the nozzle 62 are provided in the groove forming member 66, and as a result, a portion between the grooves of the groove forming member 66 protrudes to the channel. A shape of the groove is annular or spiral, for example. The groove forming member 66 may be formed of the same member as that of the nozzle 62 or may be formed of a member different from that of the nozzle 62. The groove may penetrate the groove forming member 66 or does not have to penetrate the groove forming member 66.

The nozzle 62 in this embodiment includes a stage in which the groove forming member 66 is provided on the inner wall surface and a stage in which the groove forming member 66 is not provided on the inner wall surface. Specifically, the groove forming member 66 in this embodiment is provided only on the third stage 62e which is the final stage but not provided on the first and second stages 62a and 62c which are stages other than the final stage. As a result, the aforementioned groove is provided only on the third stage 62e in the first to third stages 62a, 62c, and 62e.

Reference character $P_4$ denotes a region between the nozzle 62 and the inlet 63 in the containing case 61. The pressure of the gas-containing liquid 3 having flowed into the region $P_4$ from the inlet 63 at a high speed lowers in the region $P_4$. As a result, cavitation bubbles are generated in the gas-containing liquid 3 in the region $P_4$. Though the aforementioned bubbles 3b are normal bubbles maintained by an action of surface tension, the cavitation bubbles are hollowed bubbles generated by a drop of the pressure of the gas-containing liquid 3 and maintained without the action of surface tension.

Reference character $P_5$ denotes a region between the nozzle 62 and the outlet 64 in the containing case 61. In this embodiment, the gas-containing liquid 3 is injected to the region $P_5$ from the nozzle 62, and the bubbles 3b are generated in the gas-containing liquid 3 in the region $P_5$.

Here, functions of the first to third stages 62a, 62c, and 62e will be described.

The first stage 62a is a portion where a flow of the gas-containing liquid 3 at a high speed and a low pressure is generated. Speed-up of the gas-containing liquid 3 is realized due to the fact that the first diameter is small, and pressure lowering of gas-containing liquid 3 is realized since the pressure of the gas-containing liquid 3 lowers in the region $P_5$. The reason for the speed-up and the pressure lowering of the gas-containing liquid 3 is that, from recent study results, it is considered the more the speed is increased and the pressure is lowered in the gas-containing liquid 3, the large number of fine bubbles 3b can be generated in the end.

The second stage 62c is a portion where the cavitation bubbles in the gas-containing liquid 3 expand. When the gas-containing liquid 3 passes through the second stage 62c, the normal microbubbles and nanobubbles in the gas-containing liquid 3 also expand.

The third stage 62e is a portion where the cavitation bubbles are crushed by a shearing force caused by the groove in the groove forming member 66 so as to make them nanobubbles. When the gas-containing liquid 3 passes through the third stage 62e, the normal microbubbles in the gas-containing liquid 3 are also crushed by the sharing force and become nanobubbles.

In this embodiment, in the first flared portion 62b which is a border portion between the first stage 62a and the second stage 62c and in the second flared portion 62d which is a border portion between the second stage 62c and the third stage 62e, the inner diameters of the channels rapidly increase. Such rapid increase of the inner diameter of the channel has an action that causes expansion or crush of the cavitation bubbles and the like to occur more easily.

Each of the nozzles 62 of the activation module 13 may include first to N-th stages each having first to N-th inner diameters (N is an integer of 2 or more) in order from an upstream of the channel. That is, the number of stages of each of the nozzles 62 may be any number other than three. In this case, the first to N-th inner diameters of the first to N-th stages are set to become wider in a direction toward the downstream stage in the channel. Each of the nozzles 62 in this case is constituted to include a stage in which the groove forming member 66 is provided on the inner wall surface and a stage in which the groove forming member 66 is not provided on the inner wall surface. For example, the groove forming member 66 in this case is provided only on the N-th stage in the first to N-th stages.

FIGS. 15A to 15B are sectional views illustrating the structure of the nozzles 62 in FIG. 14.

FIG. 15A is a sectional view of the nozzles 62 seen upward from a section along an M-M' line in FIG. 14 and illustrates a shape of an end portion of the first stage 62a of each nozzle 62. On the other hand, FIG. 15B is a sectional view of the nozzles 62 seen downward from a section along an N-N' line in FIG. 14 and illustrates a shape of an end portion of the third flared portion 62f of each nozzle 62.

As illustrated in FIGS. 15A and 15B, the activation module 13 in this embodiment includes four nozzles 62, and these nozzles 62 are arranged in point symmetry to the center axis σ of the containing case 61. The number of nozzles 62 of the activation module 13 may be any other than four.

FIG. 16 is a sectional view illustrating the structure of the nozzles 62 in FIG. 14. FIG. 16 illustrates a section of one nozzle 62 of the activation module 13 from the same direction as that in

FIG. 14.

Reference character τ denotes a center axis of the nozzle 62. Reference character $\varphi_1$ denotes an inclination angle of the inner wall surface of the first flared portion 62b with respect to the center axis τ. Reference character $\varphi_2$ denotes an inclination angle of the inner wall surface of the second flared portion 62d with respect to the center axis τ. Reference character $\varphi_3$ denotes an inclination angle of the inner wall surface of the third flared portion 62f with respect to the center axis τ. The angles $\varphi_1$, $\varphi_2$, and $\varphi_3$ in this embodiment are set to 30 degrees, 45 degrees, and 22 degrees, respectively.

Figure 17:
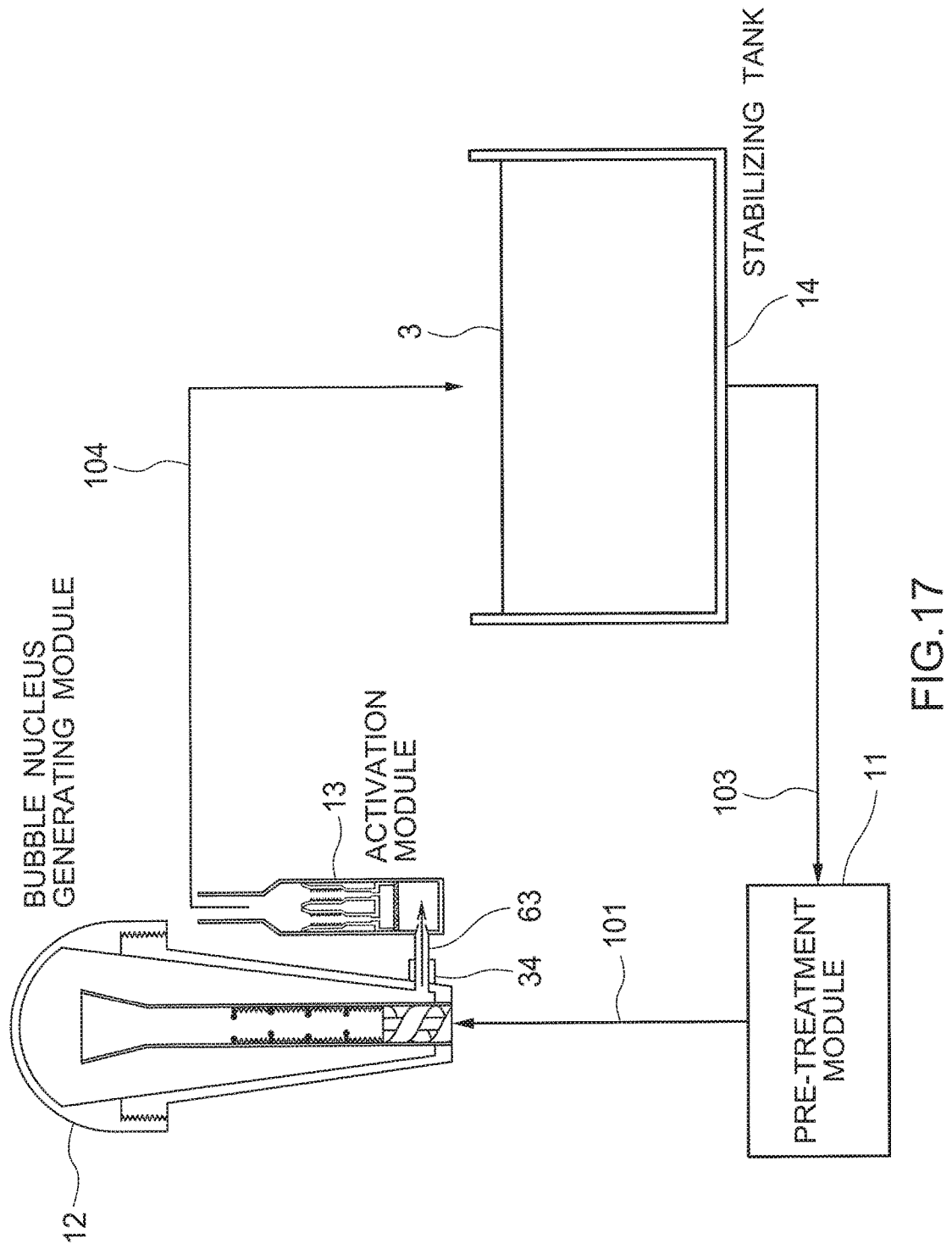
FIG. 17 is a schematic view illustrating constitution of a gas-containing liquid generating apparatus in the third embodiment.

FIG. 17 is a schematic view illustrating constitution of a gas-containing liquid generating apparatus of a third embodiment.

In this embodiment, the inlet 63 of the activation module 13 is directly attached to the outlet 34 of the bubble nucleus generating module 12. Therefore, the gas-containing liquid generating apparatus in this embodiment does not include a channel connecting the bubble nucleus generating module 12 and the activation module 13.

On the other hand, the activation module 13 in this embodiment is arranged outside the stabilizing tank 14. Therefore, the gas-containing liquid generating apparatus in this embodiment includes a channel 104 that feeds the gas-containing liquid 3 discharged from the outlet 64 of the activation module 13 to the stabilizing tank 14. The aforementioned tube 67 corresponds to an example of the channel 104.

In the channel 102 in FIG. 11 in the first embodiment, the gas-containing liquid 3 is fed at a high pressure, but in the channel 104 in FIG. 17 in the third embodiment, the gas-containing liquid 3 is fed at a low pressure.

FIG. 18 is a schematic view illustrating constitution of the gas-containing liquid generating apparatus of a variation of the third embodiment.

The gas-containing liquid generating apparatus of this variation includes a valve 201 that supplies the gas-containing liquid 3 flowing through the channel 104 to the channel 103 by bypassing the stabilizing tank 14. By using this valve 201, the gas-containing liquid 3 can be repeatedly circulated through the pre-treatment module 11, the bubble nucleus generating module 12, and the activation module 13 in this order. In this case, repeated circulation of the gas-containing liquid 3 in shorter time is made possible as compared with a case in which the gas-containing liquid 3 is circulated through the stabilizing tank 14.

The gas-containing liquid generating apparatus of this variation further includes a valve 202 that shuts off supply of the gas-containing liquid 3 from the stabilizing tank 14 to the pre-treatment module 11. If the gas-containing liquid 3 is made to bypass the stabilizing tank 14 by the valve 201, the valve 202 is preferably closed.

The gas-containing liquid generating apparatus of this variation further includes a channel 105 that extracts the gas-containing liquid 3 in the activation module 13 from the activation module 13 without injecting it from the nozzle 62 and a valve 203 provided on the channel 105. The channel 105 is connected to the region $P_4$ in the containing case 61 of the activation module 13. The gas-containing liquid 3 in the activation module 13 is extracted from the channel 105 by opening the valve 203.

As described above, the gas-containing liquid generating apparatus in this embodiment includes the pre-treatment module 11, the bubble nucleus generating module 12, and the activation module 13, and the activation module 13 includes a multi-stage type nozzle 62 having the channel that injects the gas-containing liquid 3 and the protruding portion (groove forming member 66) protruding to the channel from the inner wall surface of the nozzle 62.

Therefore, according to this embodiment, the gas-containing liquid 3 containing the fine bubbles 3b at high concentration can be generated more easily by speed-up or pressure lowering of the gas-containing liquid 3 by the activation module 13 and expansion, crush and the like of the cavitation bubbles.

The examples of the specific modes of the present invention have been described above by using the first to third embodiments of the present invention, but the present invention is not limited to these embodiments. These embodiments can be put into practice by adding various changes within the range not departing from the gist of the present invention. The range of the present invention includes forms with these changes added.

REFERENCE SIGNS LIST

1: gas, 1a: gas molecule,
2: liquid, 2a: liquid molecule,
3: gas-containing liquid,
3a; bubble nucleus, 3b: bubble,
11: pre-treatment module,
12: bubble nucleus generating module,
13: activation module,
14: stabilizing tank,
21: housing, 22: inlet, 23: outlet,
24: driving gear, 25: driven gear,
31: containing case,
32: cylindrical portion,
33: inlet, 34: outlet,
35: shaft member,
36: spiral channel,
37: projection,
38: groove forming member,
39: ultrasonic oscillator,
41: housing, 41a: handle,
41b: opening, 42: driving motor,
51: outer case, 52: inner case,
53: cylindrical portion,
54: inlet, 55: injection port,
56: foaming nozzle,
57: front-surface pressure control lid,
58: rear-surface pressure control lid,
61: containing case,
61a: first containing portion,
61b: connecting portion,
61c: second containing portion,
62: nozzle, 62a: first stage,
62b: first flared portion,
62c: second stage,
62d: second flared portion,
62e: third stage,
62f: third flared portion,
63: inlet, 64: outlet, 65: filter,
66: groove forming member,
67: tube,
101, 102, 103, 104, 105: channel,
201, 202, 203: valve

The invention claimed is:

1. A gas-containing liquid generating apparatus comprising:
   a gas/liquid mixing module configured to mix a gas and a liquid to generate a gas-containing liquid;
   a first injection module configured to inject the gas-containing liquid supplied from the gas/liquid mixing module; and
   a second injection module configured to inject the gas-containing liquid supplied from the first injection module to generate bubbles in the gas-containing liquid,
   wherein the first injection module comprises:
   a containing portion configured to contain the gas-containing liquid;
   a cylindrical portion having a channel configured to inject the gas-containing liquid into the containing portion; and
   a protruding portion provided on an inner wall surface of the cylindrical portion so as to protrude into the channel.

2. The apparatus of claim 1, wherein the protruding portion comprises one or more projections protruding in a rod state from the inner wall surface of the cylindrical portion toward the channel.

3. The apparatus of claim 2, wherein the projections comprise a plurality of first projections arranged in a first section that is perpendicular to an axial direction of the cylindrical portion.

4. The apparatus of claim 3, wherein
   the projections comprise a plurality of second projections arranged in a second section that is perpendicular to the axial direction of the cylindrical portion and is different from the first section; and
   the first projections and the second projections are arranged at positions that are not overlapped with each other in the axial direction of the cylindrical portion.

5. The apparatus of claim 1, wherein the protruding portion comprises a groove forming member provided with a groove that extends linearly along the inner wall surface of the cylindrical portion.

6. The apparatus of claim 1, wherein an inner diameter of a tip portion of the cylindrical portion is set to become wider in a direction toward a downstream of the channel.

7. The apparatus of claim 1, wherein a shape of an inner wall surface of the containing portion in a vicinity of a tip of the cylindrical portion is a concave curved surface.

8. The apparatus of claim 1, wherein
   a gap between an outer wall surface of the cylindrical portion and an inner wall surface of the containing portion functions as a channel for the gas-containing liquid injected from the cylindrical portion; and
   a distance between the outer wall surface of the cylindrical portion and the inner wall surface of the containing portion is set to become narrower in a direction toward a downstream of the channel.

9. The apparatus of claim 1, wherein the containing portion comprises:
   a first member mounted on the cylindrical portion so as to surround an outer wall surface of the cylindrical portion; and
   a second member mounted on the first member in a vicinity of a tip of the cylindrical portion and capable of being detachably attached to the first member.

10. The apparatus of claim 1, wherein the cylindrical portion is connected to a plurality of spiral channels configured to inject the gas-containing liquid into the cylindrical portion.

11. The apparatus of claim 1, wherein the first injection module comprises an ultrasonic oscillator mounted on the containing portion in a vicinity of a tip of the cylindrical portion.

12. The apparatus of claim 1, wherein the gas/liquid mixing module comprises:
    first and second gears meshed with each other; and
    a housing containing the first and second gears,
    wherein the gas/liquid mixing module causes the gas and the liquid flowing into the housing to pass between the housing and the first and second gears to be mixed, and discharges the gas-containing liquid from the housing.

13. The apparatus of claim 1, wherein the second injection module comprises:
    a containing portion configured to contain the gas-containing liquid;
    one or more nozzles each having a channel configured to inject the gas-containing liquid into the containing portion; and
    a protruding portion provided on an inner wall surface of each nozzle so as to protrude to the channel,
    wherein
    each of the nozzles comprises first to N-th stages in order from an upstream of the channel where N is an integer of 2 or more, the first to N-th stages respectively having first to N-th inner diameters; and
    the first to N-th inner diameters of the first to N-th stages are set to become wider in a direction toward a downstream stage of the channel.

14. The apparatus of claim 13, wherein the first to N-th stages comprise a stage in which the protruding portion is provided on the inner wall surface, and a stage in which the protruding portion is not provided on the inner wall surface.

15. The apparatus of claim 13, wherein an inlet for the gas-containing liquid provided in the second injection module is capable of being directly and detachably attached to an outlet for the gas-containing liquid provided in the first injection module.

16. The apparatus of claim 1, wherein the first injection module injects the gas-containing liquid supplied from the gas/liquid mixing module to generate bubble nuclei in the gas-containing liquid.

17. A gas-containing liquid injecting module that injects a gas-containing liquid to generate bubbles in the gas-containing liquid, comprising:
    a containing portion configured to contain the gas-containing liquid;
    one or more nozzles each having a channel configured to inject the gas-containing liquid into the containing portion; and
    a protruding portion provided on an inner wall surface of each nozzle so as to protrude to the channel,
    wherein
    each of the nozzles comprises first to N-th stages in order from an upstream of the channel where N is an integer of 2 or more, the first to N-th stages respectively having first to N-th inner diameters; and
    the first to N-th inner diameters of the first to N-th stages are set to become wider in a direction toward a downstream stage of the channel.

* * * * *